US012264535B2

(12) United States Patent
Guest et al.

(10) Patent No.: US 12,264,535 B2
(45) Date of Patent: Apr. 1, 2025

(54) ELONGATED SUPPORT MEMBER AND A COVER FOR BEING CONNECTED TO THE SUPPORT MEMBER

(71) Applicant: BLINDSPACE AB, Smålandsstenar (SE)

(72) Inventors: Gaius Henry Guest, Kungsbacka (SE); Benjamin Nykvist, Smålandsstenar (SE); Patrik Rosdahl, Bjuv (SE); Anders Sundelin, Mölndal (SE)

(73) Assignee: BLINDSPACE AB, Smålandsstenar (SE)

( * ) Notice: Subject to any disclaimer, the term of this patent is extended or adjusted under 35 U.S.C. 154(b) by 254 days.

(21) Appl. No.: 16/634,139

(22) PCT Filed: Aug. 21, 2017

(86) PCT No.: PCT/EP2017/071056
§ 371 (c)(1),
(2) Date: Jan. 25, 2020

(87) PCT Pub. No.: WO2019/037834
PCT Pub. Date: Feb. 28, 2019

(65) Prior Publication Data
US 2020/0208464 A1 Jul. 2, 2020

(51) Int. Cl.
*E06B 9/323* (2006.01)
*E06B 9/17* (2006.01)
*E06B 9/42* (2006.01)

(52) U.S. Cl.
CPC ........ *E06B 9/17015* (2013.01); *E06B 9/1703* (2013.01); *E06B 9/323* (2013.01); *E06B 9/42* (2013.01)

(58) Field of Classification Search
CPC ............... E06B 9/17015; E06B 9/1703; E06B 9/17007; E06B 9/323; E06B 9/42
See application file for complete search history.

(56) References Cited

U.S. PATENT DOCUMENTS 5,515,901 A * 5/1996 Hall ........................ E06B 3/481 160/206
5,862,851 A 1/1999 Stoebich et al.
(Continued)

FOREIGN PATENT DOCUMENTS

CA 2509272 A1 * 3/2006 .......... E04F 10/0662
CN 113423915 A * 9/2021 ............... E06B 9/42
(Continued)

OTHER PUBLICATIONS

Machine translation of CN113423915 (Year: 2021).*
(Continued)

*Primary Examiner* — Daniel P Cahn
*Assistant Examiner* — Jeremy C Ramsey
(74) *Attorney, Agent, or Firm* — WRB-IP PLLC

(57) ABSTRACT

An elongated support member is adapted to be connected to a wall portion or roof portion defining a space for housing an extendable or movable covering, wherein the support member is adapted for supporting a plate shaped cover in a way that the cover projects from the support member so that it at least partly can conceal the space for the covering. The support member includes a pivot arrangement for forming a pivot axis so that the cover may be pivoted between a non-connected state and a connected state in relation to the support member.

19 Claims, 21 Drawing Sheets

(56) References Cited

U.S. PATENT DOCUMENTS

| | | | | |
|---|---|---|---|---|
| 8,505,865 | B2 * | 8/2013 | Wills | E06B 9/42 248/224.8 |
| 10,544,622 | B2 * | 1/2020 | Hebeisen | E06B 9/42 |
| 2017/0114593 | A1 | 4/2017 | Hebeisen et al. | |
| 2018/0087319 | A1 * | 3/2018 | McPherson | E06B 9/50 |

FOREIGN PATENT DOCUMENTS

| | | | | | |
|---|---|---|---|---|---|
| DE | 2231626 | A1 | | 1/1974 | |
| DE | 202005002160 | U1 | | 8/2005 | |
| DE | 102013014081 | B3 | | 12/2014 | |
| EP | 1674653 | A2 | | 6/2006 | |
| ES | 2526256 | A1 | * | 1/2015 | E06B 9/17023 |
| GB | 2542330 | A | | 3/2017 | |
| GB | 2555146 | A | * | 4/2018 | E04C 3/04 |

OTHER PUBLICATIONS

Machine translation of ES2526256 (Year: 2015).*

Chinese Official Action (Jul. 5, 2021) for corresponding Chinese App. 201780094050.2.

International Search Report (Dec. 19, 2017) for corresponding International App. PCT/EP2017/071056.

Australian Official Action (Jul. 13, 2023) for corresponding Australian App. 201742873.

* cited by examiner

ELONGATED SUPPORT MEMBER AND A COVER FOR BEING CONNECTED TO THE SUPPORT MEMBER

BACKGROUND AND SUMMARY

The invention relates to an elongated support member for mounting in or at a wall or roof. The support member is adapted to be connected to a wall portion or roof portion defining a space for housing at least a part of an extendable or movable covering. More specifically, the support member is adapted for supporting a plate shaped cover in a way that the cover projects from the support member so that it at least partly can conceal the space for the covering. The invention further relates to such a cover, a cover arrangement comprising the support member and the cover and a wall or roof comprising the cover arrangement.

Such a covering may be arranged for movement between a retracted state and an extended state for at least partly covering an opening in the wall or roof, such as a window opening. The elongated support member may be adapted to be attached to a section of the wall or roof defining the opening and the cover may be connected to the support member for at least partly concealing the covering in the retracted state.

Window coverings are used to cover a window to, for example, manage sunlight, to provide insulation, blackout, to ensure privacy or security, to keep insects out or for purely decorative purposes. Window coverings are usually on the interior side of windows, but exterior solutions are also available. Window coverings may also be referred to as window furnishings or window blinds.

One common type of covering comprises a sheet of material wound up on a roll, wherein the sheet of material may be extended from the roll by a rotation of the roll.

It is desirable to provide an elongated support member for mounting in or at a wall or roof, wherein the elongated support member creates conditions for a facilitated assembly and disassembly of an associated plate shaped cover.

According to an aspect of the invention, an elongated support member is adapted to be connected to a wall portion or roof portion defining a space for housing at least a part of an extendable or movable covering, wherein the support member is adapted for supporting a plate shaped cover in a way that the cover projects from the support member so that it at least partly can conceal the space for the covering, characterized in that the support member comprises a pivot means for forming a pivot axis so that the cover may be pivoted between a non-connected state and a connected state in relation to the support member.

The covering may be adapted to be extendable between a retracted position and an extended position, preferably in parallel with a plane. Further, the covering may be designed so that the boundaries of the covering define a rectangular shape in the extended state. The covering may further be continuous, like a blind or screen, or discontinuous, like a plurality of interconnected and spaced parallel vane members. Further, the covering may be rolled onto a roll. In the case the covering is discontinuous, the vane members may be interconnected via cords and assume a packed condition with decreased internal spacing in the retracted state.

Another type of covering is formed by a curtain, wherein the curtain may be slidably arranged in a track. Accordingly, the support member and/or the associated cover may be arranged to form a recessed curtain track above a window opening. The curtain may be provided with spaced sliders along a top side, wherein the sliders engage the track and the curtain is movable in a sideways direction of the window.

Further, the elongated support member may have an extension in its longitudinal direction designed for at least as long as its associated side of an opening in the wall portion or roof portion. In this way, the covering may be arranged to cover a complete extension of the opening along said side.

Further, the elongated support member may have a longitudinal extension along a straight line and be substantially rigid. Further, the elongated support member may be formed in a metallic material such as aluminium and be produced via extrusion.

Further, the elongated support member may be adapted to be attached to the wall portion or roof portion in a fixed state via one or several connection means, like screws or rivets or glue.

According to one example, the elongated support member may be adapted for supporting the covering. The covering may be formed by an extendable covering/blind/curtain for movement between a retracted state and an extended state for at least partly covering the opening in the wall or roof, such as a window opening. The elongated support member may be adapted for housing the covering/blind/curtain in a fully a retracted state. More specifically, the elongated support member may be adapted for holding a roll, on which the covering/blind may be rolled and unrolled.

According to one example, the cover may be adapted to at least substantially conceal the space for the covering, which may indicate a complete concealing of the space or indicate that a small portion of the elongated support member may be visible, such as through a slot or passage.

According to one example, the cover may be formed by an elongated cover and arranged in a way that a longitudinal direction of the cover is in parallel with a longitudinal direction of the support member in the connected state.

According to a further example, the cover may be arranged in a way that a main extension plane of the cover is in parallel with a longitudinal direction of the support member in the connected state.

Further, the cover may have a longitudinal extension along a straight line and be substantially rigid. Further, the cover may be formed in a metallic material such as aluminium and be produced via extrusion.

Further, such an elongated support member creates conditions for an architect or a designer during planning a construction or building comprising a window opening to at least temporarily conceal the support member and any other structures, such as a covering roll and associated holders and guides for the covering or the locations of such operative structures during installation. Further, such an elongated support member creates conditions for postponing selection of one of a plurality of available covering solutions, such as the number of coverings and the types of coverings.

Further, an elongated support member may be built in adjacent a window opening at the time of construction of a building or subsequently as a retrofit.

The pivot design creates conditions for a facilitated disassembly of the cover in that an operator may grab a side edge of the cover opposite the pivot means and pivot the cover around the pivot axis until the cover is released from the support member and then remove the cover from the support member. In a similar fashion, in an assembly operation, the operator may grab the side edge of the cover opposite the corresponding pivot means of the cover, match the cover relative to the pivot means and pivot the cover around the pivot axis until the cover is connected to the support member.

According to one example, the pivot means of the support member may be adapted for matching a corresponding pivot means of the cover. More specifically, the pivot means may form a rounded surface (either convex or concave) in a cross section perpendicular to the longitudinal direction of the elongated support member.

According to a further example, the pivot means is arranged so that the pivot axis is in parallel with the longitudinal direction of the support member. Thus, the pivot means may be arranged along a long side of the support member.

According to a further example, the pivot means may form a continuous structure in parallel with the longitudinal direction of the support member and along a substantial portion of the length of the elongated support member, preferably spanning the complete length of the support member.

According to a further embodiment example, the support member has a plate shaped element with an interior side for facing the space for the covering and an exterior side opposite the interior side adapted for facing a surface of the wall portion or roof portion and wherein the pivot means is arranged at an edge of the plate shaped element between the interior side and the exterior side.

The position of the pivot means at the edge of the plate shaped element creates conditions for rigidly attaching the support member to a sidewall defining the space for the covering and applying the cover to and removing the cover from the support member in an easy way when the support member is mounted to the wall or roof.

According to a further example, the cover may be arranged in a way that a main extension plane of the cover is perpendicular in relation to a main plane of the plate shaped element of the support member in the connected state.

According to a further embodiment example, the pivot means of the support member is arranged on the interior side of the plate shaped element. This embodiment example creates further conditions for an aesthetically attractive solution.

According to a further example, the pivot means of the support member is formed in a one-piece unit with the plate shaped element.

According to a further embodiment example, the pivot means of the support member is positioned at a distance from the edge of the plate shaped element so that an edge of the cover may fit outside the pivot means and the surfaces of the edge of the plate shaped element and an outward facing surface of the cover may be substantially flush. This embodiment example creates further conditions for an aesthetically attractive solution.

For example, the pivot means of the support member may be formed by a projection defining a convex pivot contact surface. Further, the projection may be positioned at a distance from the edge of the plate shaped element so that an edge of the cover may fit outside the projection and the surfaces of the edge of the plate shaped element and an outwards facing surface of the cover are substantially flush. Preferably, the edge of the cover and the adjacent surface of the support member outside the projection may be positioned in contact or at least closely adjacent each other.

According to one embodiment example, a section of the support member is tapering towards the edge of the plate shaped element. The tapering creates conditions for an aesthetically attractive arrangement of the elongated support member in the wall or roof in that a thickness of the plate shaped element at the edge may be thin, wherein only the thin edge may be visible from one side after mounting in the wall or roof and application of skim plaster coat or possibly the edge may be covered altogether by the skim plaster coat and thereby not visible at all. Further, the tapering creates conditions for a robust production in that the elongated support member, possibly except for the tapering section (depending on the material thickness at the smallest cross section), may be produced in a conventional way, such as via extrusion. The tapering design may be achieved via machining/cutting/chamfering an end portion of the plate shaped member so that the desired tapering shape towards the edge is formed.

Further, finishing of a wall or roof after mounting of the elongated support member may be facilitated in that skim plaster coat may be applied in an easy and time-efficient way by scraping skim plaster coat via a tool against the edge. Thus, the elongated support member allows for the skim plaster coat to be applied flush with the edge. Further, the final appearance of the installation may be improved in comparison with a conventional edge design with an edge surface orthogonal to an extension of the plate shaped element in that paint may be applied on the skim plaster coat so that only a thin edge of the elongated support member is visible or the edge may be covered altogether by the skim plaster coat.

According to one embodiment example, the tapering section of the support member is positioned in an edge region adjacent the edge. More specifically, the tapering may be continuous in the edge region. This design creates further conditions for a robust design in that only the edge region of the plate shaped element may be machined in a step after the main shape of the elongated support member is formed.

The tapering section may be directed so that a first side of the plate shaped element is formed by the interior side of the of the plate shaped element.

According to a further embodiment example, the support member comprises a first surface in the edge region on a first side and a second surface in the edge region on a second side opposite the first side, wherein the edge is formed by a line that is an intersection of the first surface and the second surface. This embodiment is especially adapted for an aesthetically attractive arrangement in that only the line may be visible from one side of the elongated support member after mounting and finishing or the edge may be covered altogether by the skim plaster coat.

According to a further embodiment example, the first surface extends in parallel with a first plane and the second surface extends in parallel with a second plane and wherein the second plane is angled in relation to the first plane. The term "plane" may be defined as an imaginary flat surface in which a straight line between any two points on it lies wholly within that surface. This embodiment example creates conditions for a cost-effective production, such as via chamfering the edge region of the plate shaped element.

According to a further embodiment example, the first surface extends in parallel with and flush with a main surface on the first side of the plate shaped element outside of the edge region and wherein the second surface extends at an angle in relation to a main surface on the second side of the plate shaped element outside of the edge region. In other words, the second surface may be a chamfered surface. According to this embodiment example, only one side of the plate shaped element needs to be machined.

According to a further embodiment example, the first surface and the second surface of the plate shaped element in the edge region, extend with an angle in the interval 15-75 degrees and especially in the interval of 30-60 degrees in relation to each other. Preferably, the first surface and the second surface of the plate shaped element in the edge region extend with an angle of 45 degrees in relation to each other. This design creates further conditions for a robust production in that the tapering material thickness at the edge is not so small that it may brake while being sufficiently thin for achieving an aesthetically attractive design in a wall or roof.

According to a further example, the plate shaped element has a substantially uniform thickness outside the edge region. This embodiment creates conditions for a robust production of the elongated support member, such as via extrusion. In other words, the plate shaped element is only tapering in the edge region.

According to a further embodiment example, the support member comprises an engagement means adapted for engagement with the cover in the connected state. Further preferably, the engagement means of the support member is formed in a one-piece unit with the plate shaped element.

According to a further embodiment example, the engagement means of the support member is adapted for a snap connection. In other words, the engagement means is adapted to form a click connection for an easy attachment and release of the cover. Thus, the design does not depend on gravity. This enables applications not only where the support member is arranged above a window opening in a way that the covering is extendable downwards from the support member, but also where the support member is arranged sideways of the window opening, forming side channels for the covering and where the support member is arranged below a window opening in a way that the covering is extendable upwards from the support member.

More specifically, the engagement means of the support member may comprise a projection adapted to be elastic in a transverse direction for, during connection, allowing movement of one part passed a widened section of the other part and thereafter urged back to an engagement state in a narrow section on another side of the widened section.

Further, the engagement means of the support member may project in a direction perpendicular to the longitudinal direction of the elongated support member. Further, the engagement means may define an elongated shape in parallel with the longitudinal direction of the elongated support member. According to a further example, the engagement means forms a continuous structure in parallel with the longitudinal direction of the elongated support member and along a substantial portion of the length of the elongated support member, preferably spanning the complete length of the support member.

According to a further embodiment example, the cover comprises pivot means compatible with the pivot means of the support member and engagement means compatible with the engagement means of the support member for a facilitated connection of the cover with the support member.

According to one example, the engagement means of the support member is adapted for direct engagement with the cover. In other words, no intermediate body is required between the support member and the cover. This design creates further conditions for a facilitated assembly and disassembly of the cover relative to the support member.

According to a further example, the engagement means of the support member is adapted for engagement with the cover in a detachable way.

According to a further embodiment example, the engagement means of the support member is arranged on the interior side of the plate shaped element.

According to a further embodiment example, the engagement means of the support member comprises a first engagement portion projecting from a position at a first distance from the pivot means in a direction perpendicular to the pivot axis of the support member for forming a locking engagement between the cover and the support member in the connected state. According to one example, the first engagement portion projects from a position at a first distance from the pivot means in a direction along a plane defined by the plate shaped member of the support member. According to a further example, the first engagement portion comprises an engagement surface at a free end and wherein the first engagement portion is adapted for, during connection, contact a correspondingly shaped first engagement portion of the cover. The first engagement portion may form a rib projecting in a substantially perpendicular direction relative to a plane defined by the plate shaped element. The rib may have a widened part for contacting a correspondingly shaped part of the cover.

According to a further embodiment example, the first engagement portion of the support member comprises an engagement surface at a free end and wherein the first engagement portion is adapted for, during connection, allowing movement of one part of the support member and the cover passed a widened section of the other part and thereafter urging back to an engagement state in a narrow section on another side of the widened section.

According to a further embodiment example, the engagement means of the support member comprises a second engagement portion projecting from a position at a second distance from the pivot means in a direction perpendicular to the pivot axis of the support member for engaging the cover and pushing the cover towards the support member. According to one example, the second engagement portion projects from a position at a second distance from the pivot means in a direction along a plane defined by the plate shaped member of the support member. According to one example the second distance is smaller than the first distance. According to a further example, the second engagement portion comprises an engagement surface at a free end and wherein the second engagement portion is adapted for, during connection, contact a correspondingly shaped second engagement portion of the cover.

According to a further embodiment example, the engagement means comprises a first engagement portion in the form of a groove arranged at an edge of the support member and extending in a longitudinal direction of the support member for forming a locking engagement between the cover and the support member in the connected state. The groove may be adapted to receive a correspondingly shaped elongated projection at a free longitudinal end of the cover.

According to a further embodiment example, the support member comprises a back plate and two spaced side plates arranged in parallel with each other and extending perpendicularly in relation to the back plate so that the support member has a shape defining an elongated aperture extending in parallel with the longitudinal direction of the support member forming the space for the covering. Preferably, each one of the plates has a rectangular shape. Each one of the plates may be elongated with a longitudinal direction in parallel with a longitudinal direction of the elongated support member. According to a further example, the plates are of the same length and are formed in a one-piece unit. In other words, the elongated support member may form a profile with constant cross section along its extension direction comprising the plates. One of the spaced side plates will then comprise the pivot means, preferably at a long side edge of the support member. Such a design creates conditions for still further applications and is especially suitable for mounting in a groove in the wall or roof. This design further creates conditions for a proper securing of the elongated support member to the wall portion via the back plate member, and especially when mounting in a groove having a corresponding rectangular shape with a bottom surface and two opposite side surfaces.

According to an alternative to the last-mentioned embodiment example, the elongated support member forms a separate edge member for being firmly joined to an elongated housing. The housing may comprise a back plate and two spaced side plates arranged in parallel with each other and extending perpendicularly in relation to the back plate so that the housing has a shape defining an elongated aperture extending in parallel with the longitudinal direction of the housing forming the space for the covering. The support member may then be connected to a free end of a long side of one of said side plates. Further, the side plates may be of different lengths in a direction perpendicular to their longitudinal direction. More specifically, the support member may be dimensioned so that a total length of the support member and its associated side plate may be the same as a length of the other side plate in a direction perpendicular to the longitudinal direction of the housing. This alternative creates conditions for an effective production by producing the housing in different dimensions and/or designs for different applications in a cost-efficient way while producing the support member in a dimension and/or design matching a plurality of the different dimensions and/or designs of the housing.

According to a further example, the elongated support member comprises two plates arranged perpendicularly in relation to each other. Such a design creates conditions for further applications. Further, a second one of the plates may be connected to a first one of the plates having the pivot means at a long side end opposite the edge with the pivot means.

According to a further example, the elongated support member has a shape defining an elongated aperture extending in parallel with a longitudinal direction of the elongated support member. This embodiment example creates conditions for attaching an object, such as a roll, inside the aperture in a way that it is at least partly concealed. In other words, the elongated support member may have a profile defining a channel with a main extension direction in a longitudinal direction of the elongated support member, wherein the channel is open in a direction transverse of the longitudinal direction.

According to a further example, the pivot means has the shape of a hook in cross section. Preferably, the pivot means of the cover also has the shape of a hook in cross section and is adapted for engagement with the hook of the support member. Such a design creates conditions for a facilitated assembly and disassembly.

According to a further development of the last-mentioned example, the support member comprises a projection, which comprises the hook at its free end, and wherein the projection extends from a plate shaped element of the support member at a larger distance from the edge than the groove. The projection may be elongated and have a curved shape. According to one example, the projection comprising the hook and the groove are spaced in a direction along a plane defined by the plate shaped element of the support member.

It is also desirable to provide a cover for connection to an elongated support member for mounting in or at a wall or roof, wherein the cover creates conditions for a facilitated assembly and disassembly relative to the support member.

According to another aspect of the invention, a plate shaped cover for connection to a support member, which is adapted to be connected to a wall portion or roof portion defining a space for housing at least a part of an extendable or movable covering, is provided wherein the cover is adapted for connection to the support member in a way that the cover projects from the support member so that it at least partly can conceal the space for the covering, characterized in that the cover comprises a pivot means for forming a pivot axis so that the cover may be pivoted between a non-connected state and a connected state in relation to the support member.

According to one example, the plate shaped cover is elongated and adapted to be connected to the support member in a way that a longitudinal direction of the cover is in parallel with a longitudinal direction of the support member. Further, the plate shaped cover may have substantially the same length as the support member. Depending on the application, the plate shaped cover may have a shorter length than the support member. For example, in an application where two support members are arranged perpendicular to each other forming a corner, at least one of the covers may have a shorter length than its associated support member. According to an alternative, a plurality of covers are arranged on the same support member. According to one example, the plurality of covers may be arranged in a side-by-side relationship on the same support member.

According to one embodiment example, the cover has a plate shaped element with an interior side for facing the space for the covering and an exterior side opposite the interior side and that the pivot means is arranged at an edge of the plate shaped element between the interior side and the exterior side. According to one example, the plate shaped element forms the main part of the cover and the exterior side of the plate shaped element forms substantially the only part of the cover visible from the outside when the cover is in the connected state relative to the support member.

The position of the pivot means at the edge of the plate shaped element creates conditions for a good operation when connecting and disconnecting the cover relative to the support member.

According to a further embodiment example, the pivot means of the cover is arranged on the interior side of the plate shaped element. This embodiment example creates further conditions for an aesthetically attractive solution in that the pivot means will not be visible when the cover is in the connected state relative to the support member.

According to a further embodiment example, the pivot means is positioned at a distance from the edge of the plate shaped element for engaging a corresponding pivot means of the support member, wherein the edge may abut an adjacent surface of the support member and the surfaces of an outward facing surface of the cover and the edge of the support member may be substantially flush. This embodiment example creates conditions for positioning the cover in close vicinity of the support member and preferably in contact with the support member, which would give an aesthetically attractive solution.

According to a further embodiment example, the pivot means of the cover forms a recess and wherein the recess is defined in one direction by an edge section of the plate shaped element so that the edge of the edge section may be arranged close to an edge section of the support member and the surfaces of the outwards facing surface of the cover and an edge of the support member may be substantially flush.

This embodiment example creates further conditions for an aesthetically attractive solution.

According to a further embodiment example, the cover comprises an engagement means adapted for engagement with the support member in the connected state. According to a further embodiment example, the engagement means is adapted for a snap connection. This embodiment example creates further conditions for an easy mounting and dismounting of the cover relative to the support member.

According to a further embodiment example, the engagement means of the cover is arranged on the interior side of the plate shaped element of the cover. This embodiment example creates further conditions for an aesthetically attractive solution.

According to a further embodiment example, the engagement means of the cover comprises a first engagement portion projecting from the plate shaped element from a position at a first distance from the pivot means in a direction perpendicular to the pivot axis of the cover for forming a locking engagement between the cover and the support member in the connected state. According to a further example, the first engagement portion comprises an engagement surface at a free end and wherein the first engagement portion is adapted for, during connection, contact a correspondingly shaped second engagement portion of the support member.

According to one example, the first engagement portion of the cover has an extension from said position at the plate shaped element to a free end in the vicinity of a plane through the pivot axis and perpendicular to the longitudinal direction of the cover.

According to a further embodiment example, the first engagement portion of the cover comprises an engagement surface at a free end and wherein the first engagement portion is adapted for, during connection, allowing movement of one part of the cover and the support member passed a widened section of the other part and thereafter urging back to an engagement state in a narrow section on another side of the widened section.

According to a further embodiment example, the engagement means of the cover comprises a second engagement portion projecting from a position at a second distance from the pivot means in a direction perpendicular to the pivot axis of the cover for engaging the support member and pushing the cover towards the support member. According to one example the second distance is smaller than the first distance. According to a further example, the second engagement portion comprises an engagement surface at a free end and wherein the second engagement portion is adapted for, during connection, contact a correspondingly shaped second engagement portion of the support member.

According to a further embodiment example, the engagement means comprises an elongated projection at a free longitudinal end of the cover for being received in a correspondingly shaped groove in the support member.

According to a further aspect, the invention regards a cover arrangement adapted to be connected to a wall portion or roof portion defining a space for housing an extendable or movable covering, wherein the cover arrangement comprises an elongated support member according to any one of the examples above and a cover according to any one of the examples above.

According to a further aspect, the invention regards a wall or roof defining an opening, wherein the wall or roof is provided with a cover arrangement according to above adjacent the opening.

According to one embodiment example, the wall or roof has an elongated groove, which groove is adapted for receipt of the elongated support member and wherein the elongated support member is arranged in the groove.

According to a further embodiment example, the elongated support member is arranged along a first side of the opening and be rigidly attached to the wall or roof.

According to an alternative or complement, the elongated support member may be adapted to form a housing for accommodating the at least one covering in the retracted state. In other words, the elongated support member may be positioned so that its longitudinal direction is perpendicular to a movement direction of the covering. In this case, the elongated support member may define a space sufficient for accommodating the at least one covering in a fully retracted state. The elongated support member may be arranged along a first side of a wall or roof opening.

According to a further embodiment example, a further elongated support member is arranged along a second side of the opening perpendicular to the other support member and supports an edge of the extendable covering, which edge is in parallel with a movement direction between the retracted state and the extended state. Thus, the further elongated support member may be adapted to form a sideways support structure for supporting a side edge of the covering. In other words, the elongated support member may be positioned so that its longitudinal direction is in parallel with a movement direction of the covering. In this case, the elongated support member may define a space sufficient for accommodating the side edge of the covering and possibly accommodating a guide for guiding the side edge of the covering during movement of the covering. The guide may alternatively be called a rail or track.

According to a further embodiment example, the cover arrangement comprises at least two elongated support members and wherein they are arranged perpendicularly in relation to each other. According to one example, the cover arrangement comprises two elongated support members arranged perpendicularly in relation to each other and preferably connected to each other. A first one of the support members may house the covering and the other support member may form a sideways support of a side edge of the covering.

According to another example, the cover arrangement comprises two elongated support members arranged in parallel with each other. One of the two parallel elongated support members may house the covering, wherein the opposite one may be arranged on an opposite side of the opening and may comprise a roll or other counterpart for cords forming loops for guiding the covering. According to an alternative, the two parallel elongated support members are arranged on opposite sides of the opening in a sideways direction, wherein each one of them may form a sideways support of a side edge of the covering.

According to another example, the cover arrangement comprises three elongated support members, wherein a first one of the support members may house the covering and the other two may be arranged in parallel with each other forming sideways supports of opposite side edges of the covering.

According to another example, the cover arrangement comprises four elongated support members, wherein a first pair of the support members are arranged in spaced parallel relationship and a second pair of the support members are arranged in spaced parallel relationship perpendicular to the first pair. Thus, the cover arrangement may form a frame around an opening. A first one of the support members of the first pair may house the covering and the opposite support member may comprise a roll or other counterpart for cords forming loops for guiding the covering. The second pair of support members may form sideways supports of opposite side edges of the covering.

According to a further aspect, a wall or roof portion is provided, wherein the wall or roof portion comprises a wall or roof section and a cover arrangement according to any one of the above embodiment examples in the space for the covering, wherein the support member is attached to the wall portion or roof portion and wherein the cover is connected to the support member. For example, the elongated support member may be arranged in such a way that a main side surface of the support member is in contact with the wall or roof section. Further, the plate shaped element may be fastened to the wall or roof section. The wall or roof section may comprise a building board, such as a plastering board.

According to a further embodiment example, the elongated support member is arranged in such a way that the edge is positioned at a distance from an exterior surface of the wall or roof section and wherein skim plaster coat is applied between the exterior surface of the wall or roof section and the edge so that a side of the plate shaped element facing the wall or roof section is covered by the skim plaster coat. As already described above, finishing of a wall or roof after mounting of the elongated support member may be facilitated in that skim plaster coat may be applied in an easy and time-efficient way by scraping the skim plaster coat against the edge by means of a tool. Preferably, a side of the plate shaped element facing the wall or roof section is covered by the skim plaster coat all the way to the edge. Thus, only the edge, which may be formed by a thin line, may be visible. More specifically, the elongated support member is arranged in such a way that the second side of the plate shaped element faces the wall or roof section.

According to a further example, the elongated support member is arranged in such a way that the edge of the plate shaped element projects from a plane defined by an exterior surface of the wall or roof section. By positioning the elongated support member in such a way that the edge of the plate shaped element projects from a plane defined by an exterior surface of the wall or roof section, the skim plaster coat may be applied in an easy way with an aesthetically attractive final appearance. Preferably, skim plaster coat is applied between the exterior surface adjacent the plate shaped element and the edge so that the second surface of the plate shaped element is covered by the skim plaster coat at least substantially in its entirety.

Preferably, the elongated support member is arranged in such a way that the edge of the plate shaped element projects a small distance from the plane defined by an exterior surface of the wall or roof section. According to one example, the elongated support element is arranged in such a way that the edge of the plate shaped element projects a distance smaller than an extension of the tapering in a direction perpendicular to the longitudinal direction of the elongated support member from the plane defined by an exterior surface of the wall or roof section.

According to a further embodiment example, the space forms an elongated groove and wherein the elongated support member is received in the elongated groove. By matching an exterior shape and dimension of the elongated support member to an internal shape and dimension of the elongated groove, the elongated support member may to a great extent be concealed in the groove and preferably form a tight fit in the groove.

According to a further embodiment example, wherein the elongated support member is arranged along a first side of an opening in the wall or roof so that the covering may be moved relative to the support member for covering the opening to different extents. This embodiment example creates further conditions for an aesthetically attractive solution.

According to a further embodiment example, the elongated support member is adapted to accommodate the extendable covering in a retracted state. For example, the covering may be rolled on a roll in the retracted state.

According to a further embodiment example, the elongated support member is arranged along a second side of the opening and supports an edge of the extendable covering, which edge is in parallel with a movement direction between the retracted state and the extended state.

According to a further embodiment example, the cover arrangement comprises at least two elongated support members and wherein they are arranged perpendicularly in relation to each other.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings:

FIG. 2*a* is a cross section of the cover arrangement in FIG. 1

FIG. 4*a* is a cross section of the cover arrangement in FIG. 3

DETAILED DESCRIPTION OF EXAMPLE EMBODIMENTS

Figure 1:
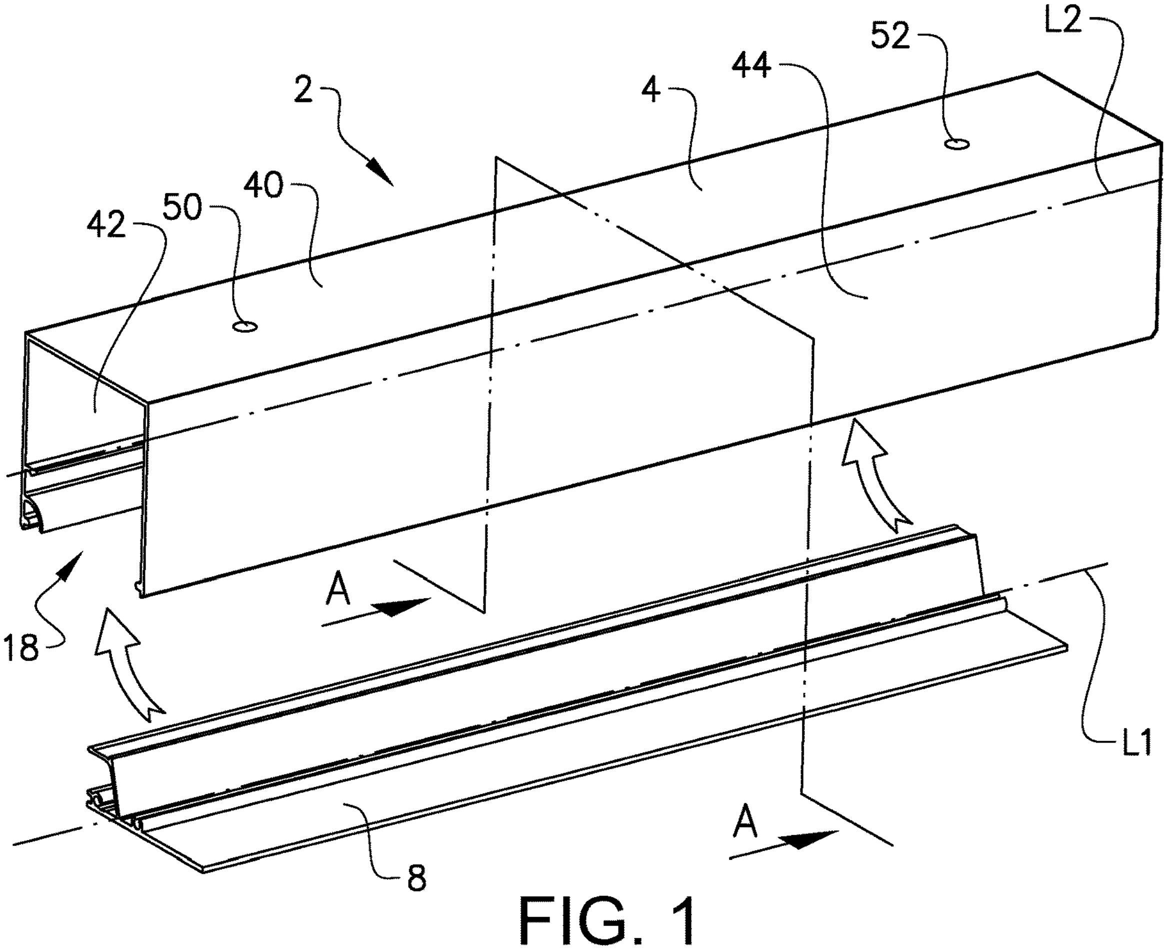
FIG. 1 is a perspective view from the top of a first embodiment of a cover arrangement.
Figure 2B:
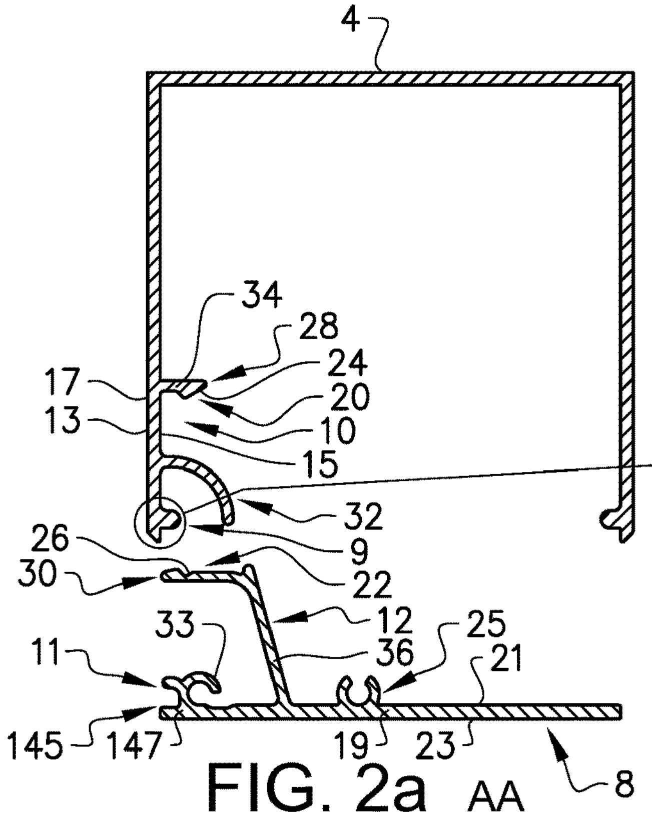
FIG. 2*b* is an enlarged view of a portion of FIG. 2*a,*
Figure 2B:
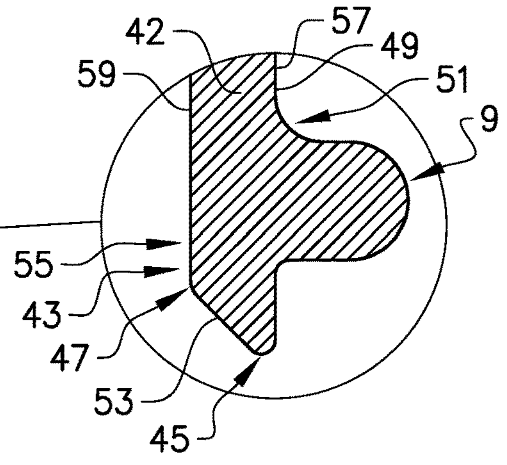
Figure 2C:
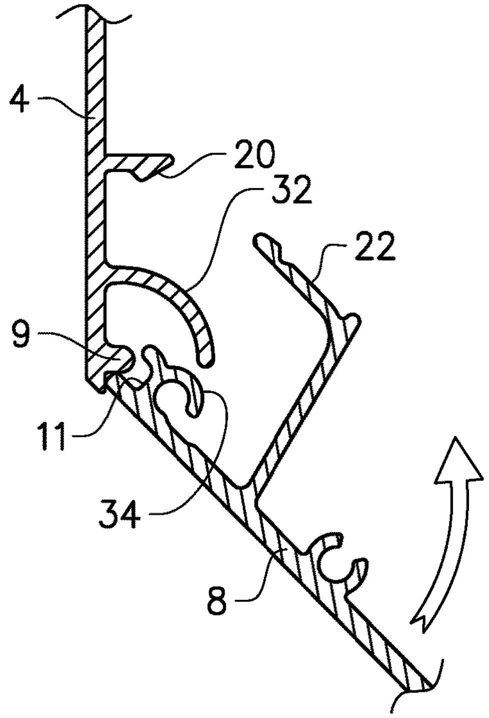
FIG. 2*c-f* shows different stages of a connection of the cover arrangement according to the first embodiment.
Figure 2D:
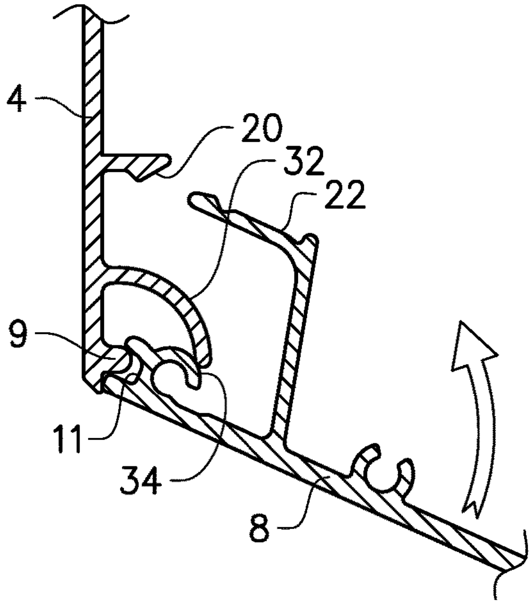
Figure 2E:
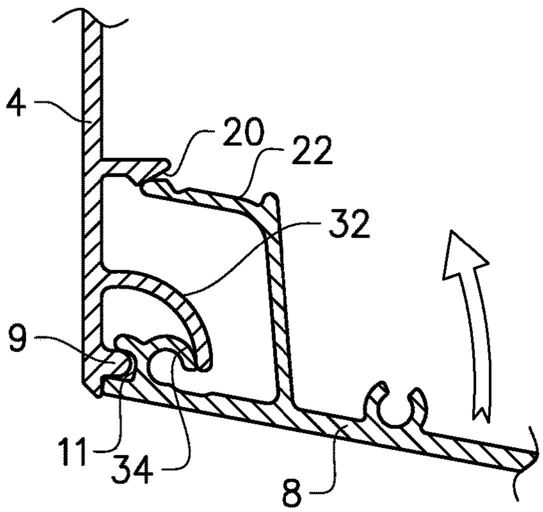
Figure 2F:
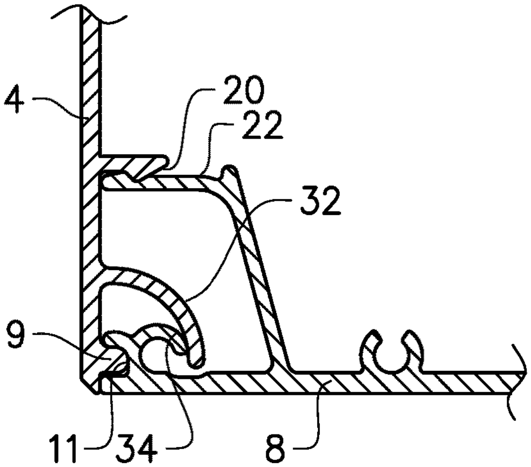

FIGS. 1, 2*a* and 2*b* show a first embodiment of a cover arrangement 2 for mounting in a wall or roof for housing at least one extendable covering (not shown). The covering may be arranged for movement between a retracted state and an extended state for at least partly covering an opening in the wall or roof. The cover arrangement 2 comprises an elongated support member 4 adapted to be attached to a wall section or roof section defining the opening. More specifically, the elongated support member 4 is adapted for accommodating at least one extendable covering in the retracted state.

The cover arrangement 2 further comprises a plate shaped cover 8 adapted to be supported by the support member 4 in a way that the cover projects from the support member so that it at least partly can conceal the space for the covering. Further, the cover 8 may be arranged for at least substantially concealing the elongated support member 4 when it is installed in a groove in the wall or roof.

The plate shaped cover 8 is elongated and adapted for connection to the elongated support member 4 in a way that a longitudinal direction L1 of the elongated cover 8 is in parallel with a longitudinal direction L2 of the elongated support member 4 in a connected state. Further, the elongated cover 8 is devoid of any slot for the covering.

Each one of the support member 4 and the cover 8 comprises a pivot means 9,11 for forming a pivot axis when engaged so that the cover 8 may be pivoted between a non-connected state and a connected state in relation to the support member 4. One of the pivot means 9,11 has a female shape and the other one of the pivot means 9,11 has a male shape. More specifically, a first one of the pivot means 9,11 forms a projection with a convex contact surface and the other one of the pivot means 9,11 forms a recess with a concave contact surface for receiving the projection. Each one of the pivot means 9,11 is formed in a one-piece unit with the respective one of the elongated cover 8 and the elongated support member 4. Further, each one of the pivot means 9,11 defines an elongated shape in parallel with the longitudinal direction of the respective one of the elongated support member 4 and the elongated cover 8.

Further, the support member 4 has a plate shaped element 13 with an interior side 15 for facing the space for the covering and an exterior side 17 opposite the interior side adapted for facing a surface of the wall portion or roof portion and the pivot means 9 is arranged at an edge 45 of the plate shaped element between the interior side and the exterior side, see FIG. 2*b*. More specifically, the pivot means 9 is arranged on the interior side 15 of the plate shaped element 13.

More specifically, the pivot means 9 is positioned at a small distance from the edge 45 of the plate shaped element 13 so that an edge section 147 of the cover 8 may fit outside the pivot means 9 and the surfaces of the edge of the plate shaped element and an outward facing surface of the cover may be substantially flush. The pivot means 9 of the support member 4 forms a projection for being received in a complimentary shaped recess of the cover.

The cover 8 has a plate shaped element 19 with an interior side 21 for facing the space for the covering and an exterior side 23 opposite the interior side. The pivot means 11 is arranged at the edge 145 of the plate shaped element between the interior side and the exterior side. Further, the pivot means 11I is arranged on the interior side 21 of the plate shaped element.

Further, the pivot means 11 forms a recess and wherein the recess is defined in one direction by an edge section 147 of the plate shaped element so that the edge 145 of the edge section 147 may be arranged close to an edge region 47 of the support member and the surfaces of the outwards facing surface of the cover and an edge of the support member may be substantially flush.

Further, each one of the elongated support member 4 and the cover 8 comprises an engagement means 10,12 for engagement with each other. The engagement means 10,12 are shaped complimentary to each other and adapted for a detachable connection of the elongated cover 8 to the elongated support member 4.

Each one of the engagement means 10,12 is formed in a one-piece unit with the respective one of the elongated cover 8 and the elongated support member 4.

Further, each one of the engagement means 10,12 defines an elongated shape in parallel with the longitudinal direction of the respective one of the elongated support member 4 and the elongated cover 8. Further, the engagement means 10,12 is adapted for a snap connection or in other words a click connection.

The engagement means 10 of the support member 4 is arranged on the interior side of the plate shaped element 13. Likewise, the engagement means 12 of the cover 8 is arranged on the interior side of the plate shaped element 19.

Further, each one of the engagement means 10,12 comprises a first engagement portion 20,22 projecting from a position at a first distance from the respective pivot means 9,11 in a direction perpendicular to the pivot axis for forming a locking engagement between the cover 8 and the support member 4 in the connected state.

Each one of the first engagement portions 20,22 comprises an engagement surface 24,26 at a free end 28,30 and wherein the first engagement portions are adapted for, during connection, allowing movement of one part of the support member and the cover passed a widened section of the other part and thereafter urging back to an engagement state in a narrow section on another side of the widened section.

The first engagement portions 22,24 are designed to form a click connection. More specifically, at least one of the first engagement portions 22,24 is elastic in a transverse direction for, during connection, allowing an elastic displacement and retraction in an engagement state. Each one of the first engagement portions 22,24 comprises a rib 34,36.

The first engagement portion 22 of the cover 8 has an extension from said position at the plate shaped element to a free end in the vicinity of a plane through the pivot means 11 and perpendicular to a plane defined by the plate shaped element 19 of the cover. The corresponding first engagement portion 20 of the support member is substantially shorter, forming a lug. Due to the rather long extension of the first engagement portion 22 from the plate shaped element to its free end, a certain flexibility is achieved to lock the cover in position and release the cover from the support member if desired. Further, the first engagement portion 22 of the cover 8 is arranged on the underside of the first engagement portion 20 of the support member in the connected state so that a force put on the cover would release rather than increase pressure during release. More specifically, the first engagement portion 22 of the cover 8 has a bent or curved shape. More specifically, the first engagement portion 22 of the cover 8 has a first part with a straight extension, which is continued via a bent region to a second part with a straight extension towards the free end.

Further, each one of the engagement means 10,12 comprises a second engagement portion 32,33 projecting from a position at a second distance from the respective pivot means 9,11 in a direction perpendicular to the pivot axis for interacting in a way pushing the cover 8 towards the support member 4. This design has the effect to minimize any gap between the support member and the cover. Preferably, the edge of the cover will abut against the adjacent surface of the support member. More specifically, the second engagement portion 32 of the support member has a bent or curved shape. More specifically, the second engagement portion 32 of the support member has a rounded shape and in this embodiment a part-circular shape. The corresponding second engagement portion 33 of the cover is substantially shorter, forming a lug. The second engagement portion 32 of the support member 4 has some elasticity and may be displaced somewhat as it travels over the corresponding engagement portion 33 of the cover.

The elongated support member 4 has a shape defining an elongated aperture 18 extending in parallel with the longitudinal direction L2 of the elongated support member 4 and the elongated cover 8 is adapted to at least substantially close the elongated aperture 18 when the elongated cover 8 and the elongated support member 4 are in a connected state.

The elongated support member 4 comprises a first plate 42, which comprises the plate shaped element 13. The first plate 42 has a rectangular shape. Further, the first plate 42 is adapted for being arranged in contact with the wall portion or roof portion. Further, the first plate 42 is elongated with a longitudinal direction in parallel with the longitudinal direction L2 of the elongated support member 4. The pivot means 9 and the engagement means 10 are arranged along a long side edge of the first plate 42.

FIG. 2*c*-*f* show different stages of a connection of the cover arrangement 2 according to the first embodiment. The cover 8 is initially positioned with its longitudinal direction substantially in parallel with the longitudinal direction of the support member, in an inclined state in relation to the support member 4 and positioned so that the pivot means 9,11 engage each other in FIG. 2*c*. More specifically, the cover 8 may initially be positioned so that a plane defined by the plate shaped element 19 is inclined in relation to a plane defined by the plate shaped element 13 of the support member 4. For example, the cover is initially positioned so that the plane defined by the plate shaped element 19 is inclined with an angle of 15-75° in relation to a plane defined by the plate shaped element 13 of the support member 4. The cover 8 is then turned relative to the support member 4 around the pivot axis, wherein in consecutive order, the second engagement means 32,33 engages first so that the cover is pushed towards the edge of the support member (to the left in the figures) followed by engagement of the first engagement means 20,22 so that the cover is connected to the support member, see FIG. 2*d*-*f*. The cover will in the final position be positioned so that the plane defined by the plate shaped element 19 is inclined with an angle of 90° in relation to the plane defined by the plate shaped element 13 of the support member 4.

For releasing (disconnecting) the cover 8 from the support member 4, a tool, such as a screwdriver, may be squeezed in between the cover 8 and the support member 4 at the opposite long side edge of the cover in relation to the pivot axis and by turning the tool, the long side edge may be accessible for further turning of the cover 8 around the pivot axis.

Turning now to FIG. 2*b*. A section 43 of the first plate 42 is tapering towards the edge 45 of the plate shaped element. More specifically, the section 43 is continuously tapering towards the edge 45.

Further, the edge 45 has an elongated shape. Further, the elongated edge 45 extends in parallel with the longitudinal direction L2 of the support member. Further, the edge 45 points in a direction perpendicular to the longitudinal direction L2 of the support member 4. Further, the tapering section 43 of the first plate 42 is positioned in an edge region 47 adjacent the edge 45.

Further, the first plate 42 comprises a first surface 49 in the edge region 47 on a first side 51 and a second surface 53 in the edge region 47 on a second side 55 opposite the first side 51, wherein the edge 45 is formed by a line that is an intersection of the first surface 49 and the second surface 53. More specifically, the edge 45 extends along a straight line.

The first surface 49 extends in parallel with a first plane and the second surface 53 extends in parallel with a second plane and wherein the second plane is angled in relation to the first plane. The term "plane" is here meant as an imaginary flat surface in which a straight line between any two points on it lies wholly within that surface.

The first surface 49 extends in parallel with and flush with a main surface 57 on the first side 51 of the first plate 42 outside of the edge region 47 and wherein the second surface 53 extends at an angle in relation to a main surface 59 on the second side of the first plate 42 outside of the edge region 47.

The first surface 49 and the second surface 53 of the first plate 42 in the edge region 47 extend with an angle in the interval 15-75 degrees and especially in the interval of 30-60 degrees in relation to each other. Further, according to the shown example, the first surface 49 and the second surface 53 of the first plate 42 in the edge region 47 extend with an angle of 45 degrees in relation to each other. Further, the first plate 42 has a uniform thickness outside the edge region.

Turning now again to FIG. 1. The elongated support member 4 comprises a second plate 40, which is arranged perpendicularly in relation to the first plate 42. The second plate 40 has a rectangular shape. The second plate 40 is elongated with a longitudinal direction in parallel with the longitudinal direction L2 of the support member 4. The second plate 40 is connected to the first plate 42 at an end of the first plate opposite the edge 45. Further, the first plate 42 and the second plate 40 are formed in a one-piece unit.

Further, the elongated support member 4 comprises a third plate 44, which is arranged in parallel with and at a distance from the first plate 42. The third plate 44 has a rectangular shape and more specifically of the same size and shape as the first plate 42. The third plate 44 is elongated with a longitudinal direction in parallel with the longitudinal direction L2 of the support member 4. The third plate 44 is connected to the first plate 42 via the second plate 40. More specifically, the first, second and third plates 42, 40, 44 are formed in a one-piece unit. The third plate 44 has a similar design of an edge region as has been described above for the first plate 42, wherein the inclination of the edge region is mirrored.

In other words, the support member 4 comprises an elongated back plate 40 and two spaced elongated side plates 42, 44 forming a U-shape in cross section. Further, the back plate 40 and the two spaced elongated side plates 42, 44 are formed in a one-piece unit. More specifically, the elongated support member 4 has a rectangular shape in a cross section, wherein the elongated aperture 18 defines an open side of the rectangle. More specifically, the elongated support member 4 has a substantially square shape in a cross section. Other designs are of course possible, especially with such a design that a depth of the elongated support member is larger than a height of the elongated support member for housing several coverings. Further, the support member 4 does not comprise any end plates closing the elongated aperture in the longitudinal direction of the support member. Such end plates may however be attached at the opposite ends of the support member. Holders for the covering may be attached to such end plates. Alternatively, holders for the covering may be attached to any one of the plates 40,42,44 defining the elongated aperture in a transverse direction of the support member, see FIG. 12. According to a further alternative, for the example where the support member 4 does not comprise any end plates closing the elongated aperture in the longitudinal direction of the support member, holders for the covering may be attached directly to the wall or roof at the opposite ends of the support member.

The elongated cover 8 is formed by an elongated rectangular plate, which is adapted to match the boundaries of the elongated aperture 18.

Further, the support member 4 comprises means 50,52 for attachment of the support member 4 to the wall or roof portion. The attachment means 50,52 are here formed by through holes in the back plate 40 for receipt of fasteners, like screws or rivets.

According to an alternative design of a cover arrangement, a single support member may have a plurality of covers connected to it. In such a case, the covers may be arranged next to each other in the longitudinal direction of the support member. For such an alternative, the cover 8 comprises a means 25, see FIG. 2*a*, for connection to an adjacent cover in order to keep the covers together and minimize any gap between the covers. The connection means 25 is formed by a projecting structure on the interior side 21 of the cover 8. Also the adjacent cover would then have such a connection means at its short side edge facing the other cover. More specifically, the connection means 25 is adapted for receipt of a pin or other connection element for bridging the distance between the covers.

Figure 3:
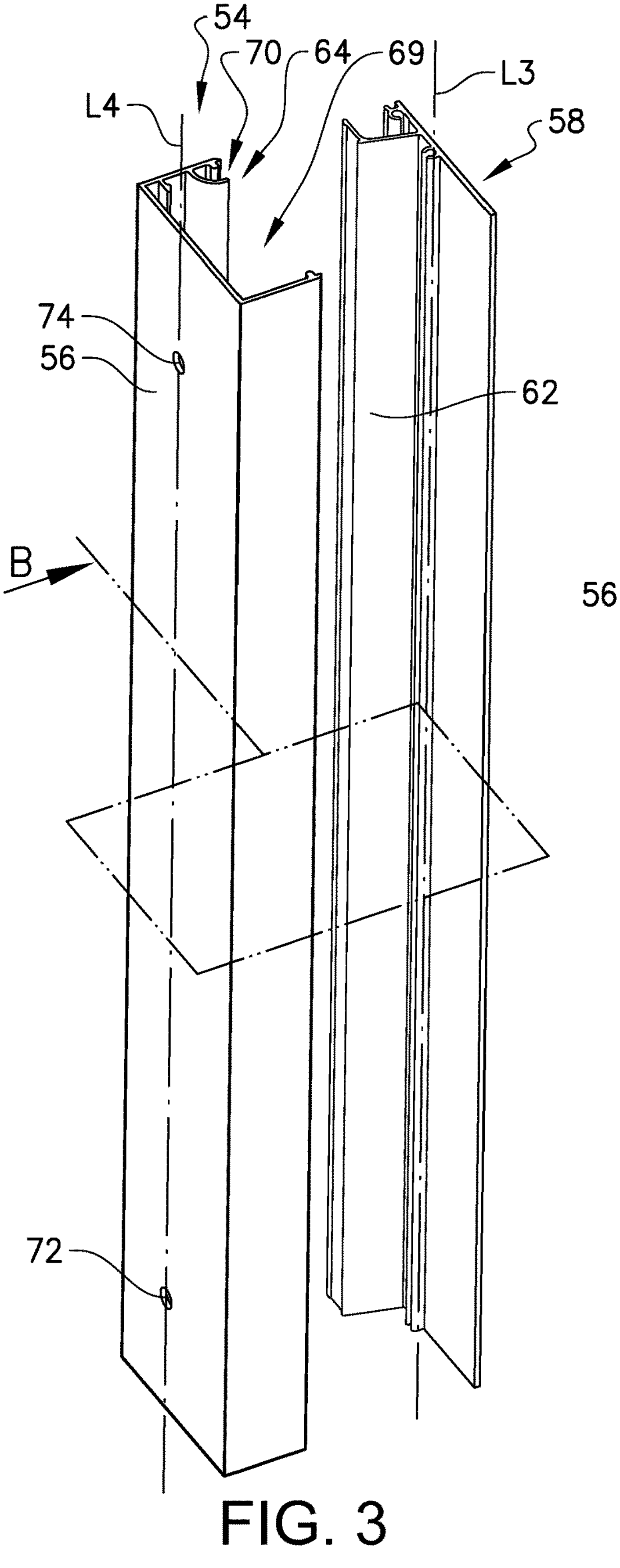
FIG. 3 is a perspective view from the top of a second embodiment of a cover arrangement.

FIGS. 3 and 4*a* show a second embodiment of a cover arrangement 54 for mounting in a wall or roof for supporting the at least one extendable covering (not shown). The cover arrangement 54 comprises an elongated support member 56 adapted to be attached to a wall portion or roof section defining the opening. More specifically, the elongated support member 56 is adapted for supporting a sideways edge of the at least one extendable covering. More specifically, the elongated support member 56 is adapted for supporting an edge of the at least one extendable covering, which edge is in parallel with a movement direction between the retracted state and the extended state.

The cover arrangement 54 further comprises a plate shaped cover 58 adapted to be supported by the support member 56 in a way that the cover projects from the support member so that it at least partly can conceal the space for the covering. Further, the cover 58 may be arranged or at least substantially concealing the elongated support member 56. The cover 58 is elongated and adapted for connection to the elongated support member 56 in a way that a longitudinal direction L3 of the elongated cover 58 is in parallel with a longitudinal direction L4 of the elongated support member 56 in a connected state. Further, the elongated cover 58 is devoid of any slot for the covering.

Each one of the support member 56 and the cover 58 comprises a pivot means and an engagement means 62,64 in a similar fashion as has been described above for the first embodiment.

The elongated support member 56 has a shape defining an elongated aperture 69 extending in parallel with the longitudinal direction L4 of the support member 56 and the cover 58 is adapted to at least substantially close the elongated aperture 69 when the cover 58 and the support member 56 are in a connected state.

The cover arrangement 54 has to a great extent a similar design as has been described above for the cover arrangement 2 according to the first embodiment. The following description of the second embodiment of the cover arrangement 54 will therefore focus on the differences in relation to the first embodiment of the cover arrangement 2.

The elongated support member 56 according to the second embodiment has substantially the same width as a width of the support member 4 according to the first embodiment. Further, the elongated support member 56 according to the second embodiment has a substantially smaller depth in relation to a depth of the support member 4 according to the first embodiment. This is due to the fact that the elongated support member 4 according to the first embodiment is adapted for accommodating one or a plurality of coverings while the elongated support member 56 according to the second embodiment is adapted for supporting and/or guiding an edge of the covering during movement of the covering. The depth and width are defined in perpendicular directions and both are perpendicular to the longitudinal direction of the respective elongated support member 4, 56. In other words, the elongated support member 56 according to the second embodiment has a rectangular shape in a cross section with a longer extension in the width direction than in the depth direction.

The elongated support member 56 according to the second embodiment is provided with at least one means 72,74 for connection to the wall portion. The connection means 72,74 are formed by through holes for receipt of a fastener, such as a screw or rivet.

Figure 5:
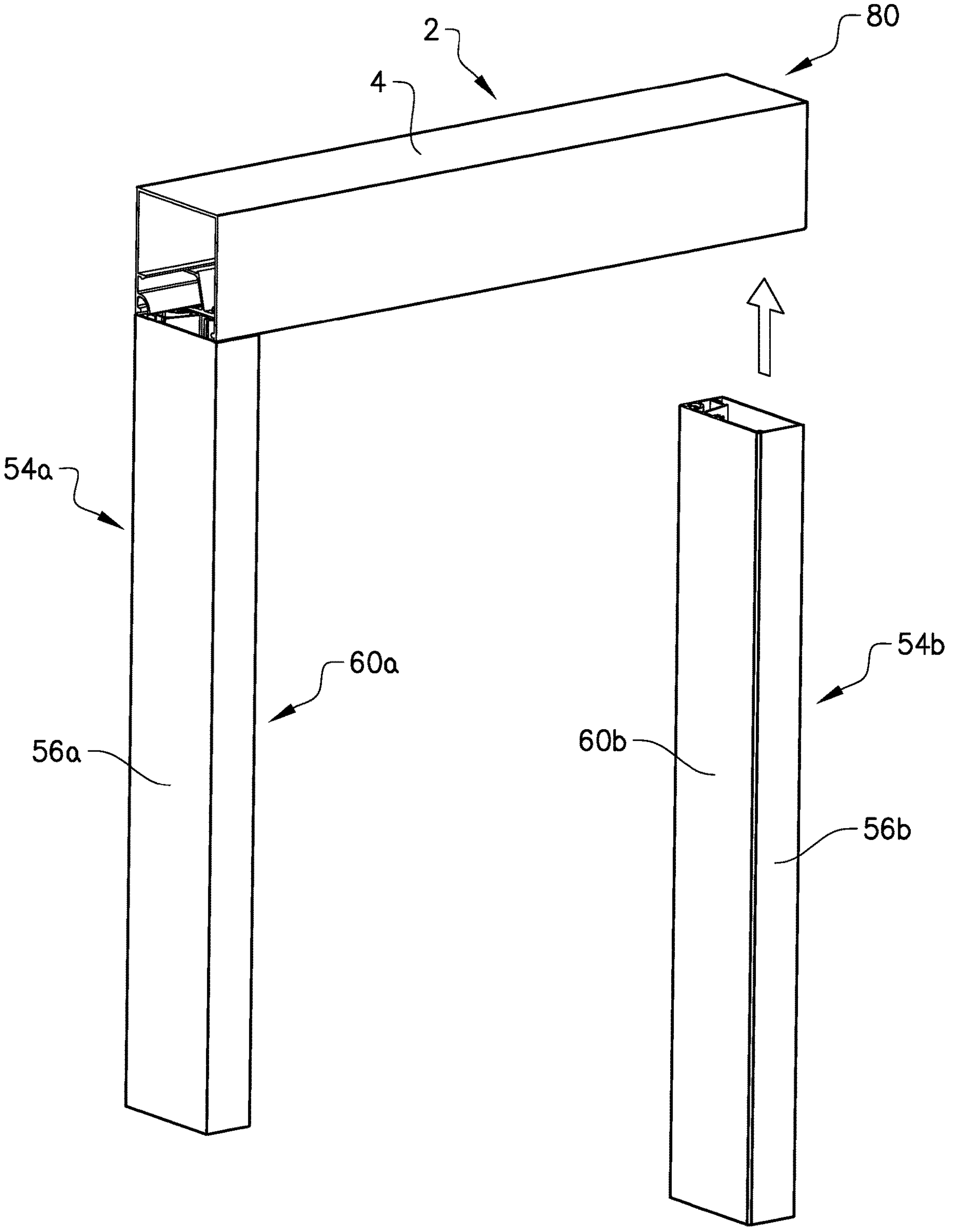
FIG. 5 is a perspective view from the top of a third embodiment of a cover arrangement.

The elongated support member 4 according to the first embodiment and the elongated support member 56 according to the second embodiment may be arranged in relation to each other in a way that the longitudinal directions are perpendicular to each other, see FIG. 5. Further, the elongated support member 56 according to the second embodiment has an open end 70 in its longitudinal direction for allowing movement of the covering from a retracted state inside the elongated support member 4 according to the first embodiment and into the elongated support member 56 according to the second embodiment.

Figure 4B:
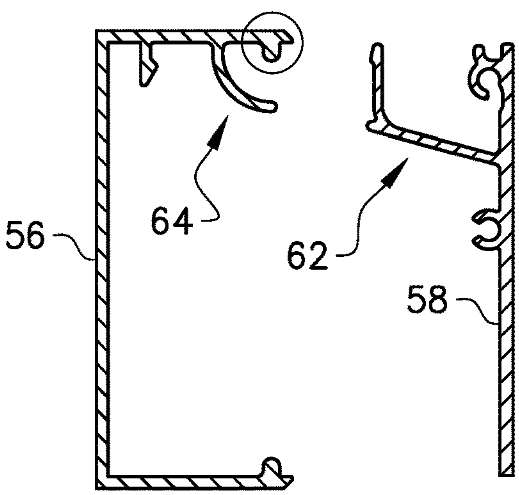
FIG. 4*b* is an enlarged view of a portion of FIG. 4*a,*
Figure 4B:
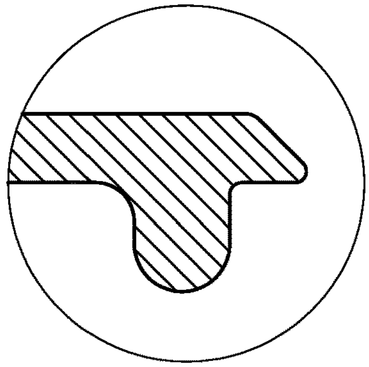

The elongated support member 56 according to the second embodiment has a similar design of edge regions as has been described above for the elongated support member 4 according to the first embodiment, see enlargement in FIG. 4*b*. It will therefore not be further explained here.

FIG. 5 is a perspective view from the top of a third embodiment of a cover arrangement 80. The cover arrangement 80 according to the third embodiment comprises one cover arrangement 2 according to the first embodiment and two cover arrangements 54*a*. 54*b* according to the second embodiment, wherein the two cover arrangements 54*a*, 54*b* according to the second embodiment are positioned so that the elongated covers 60*a*, 60*b* face each other. Further, the two cover arrangements 54*a*, 54*b* according to the second embodiment are positioned spaced from each other and in parallel relationship. Further, the two elongated support members 56*a*, 56*b* of the cover arrangements 54*a*, 54*b* according to the second embodiment are arranged at opposite ends of the elongated support member 4 of the cover arrangement 2 according to the first embodiment.

Figure 6:
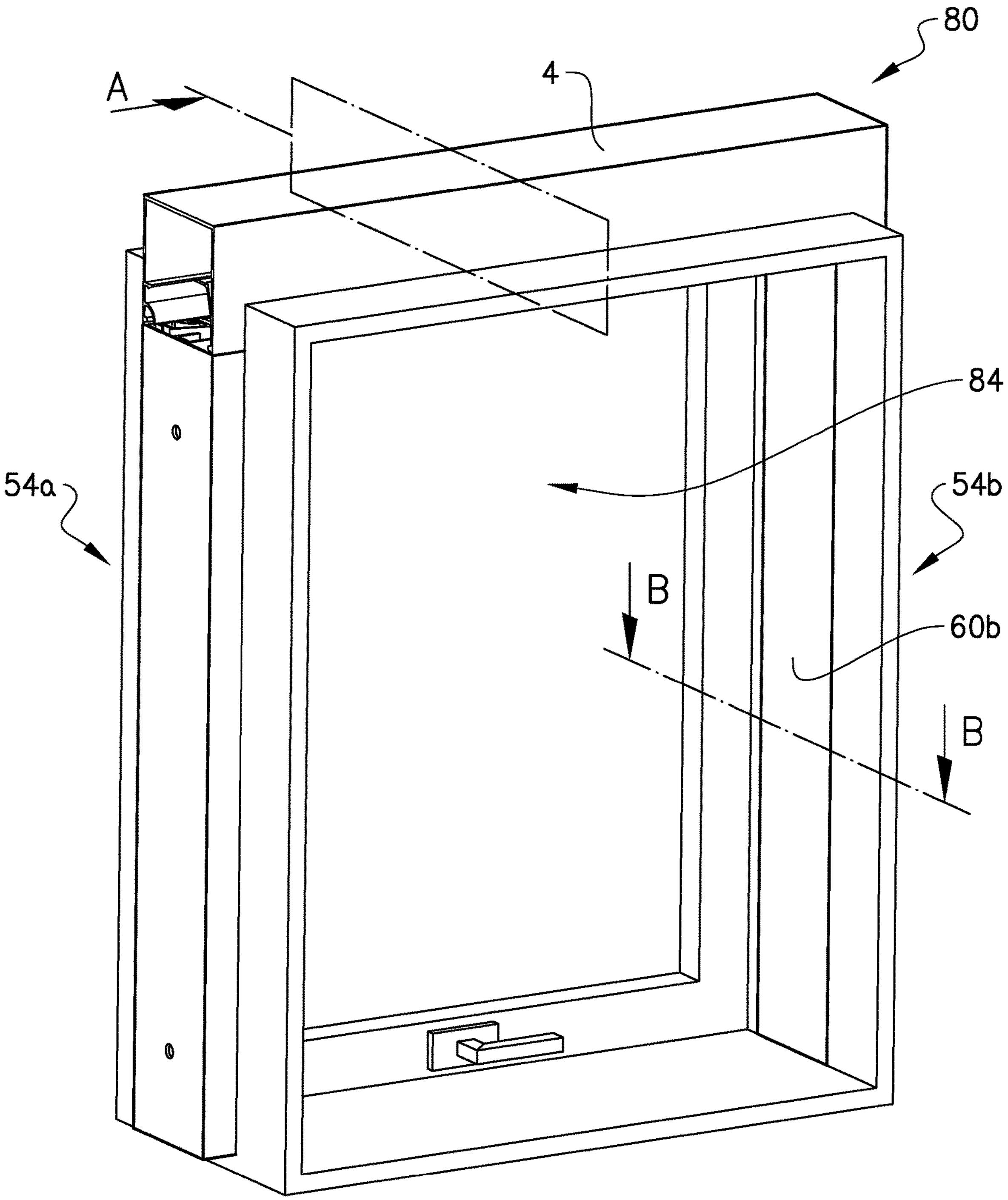
FIG. 6 is a perspective view of a wall portion with the cover arrangement according to FIG. 5 installed.

FIG. 6 is a perspective view of a wall portion defining a window opening 84. The wall portion comprises the cover arrangement 80 according to FIG. 5. More specifically, the wall portion 82 has an elongated groove 86*a*, 86*b*, see FIGS. 8-9, adapted for receipt of the elongated support members 4, 56*a*, 56*b*. More specifically, the elongated groove 86*a*, 86*b* extends along three sides of a rectangle. More specifically, the elongated support members 56*a*, 56*b* according to the second embodiment are arranged at the respective ends of the elongated support member 4 according to the first embodiment in a way that an installed covering may be extended from a retracted state within the elongated support member 4 while its edge being supported and/or guided by the elongated support members 56*a*, 56*b* according to the second embodiment (when the covers 60*a*,60*b* are removed/exchanged).

Figure 8B:
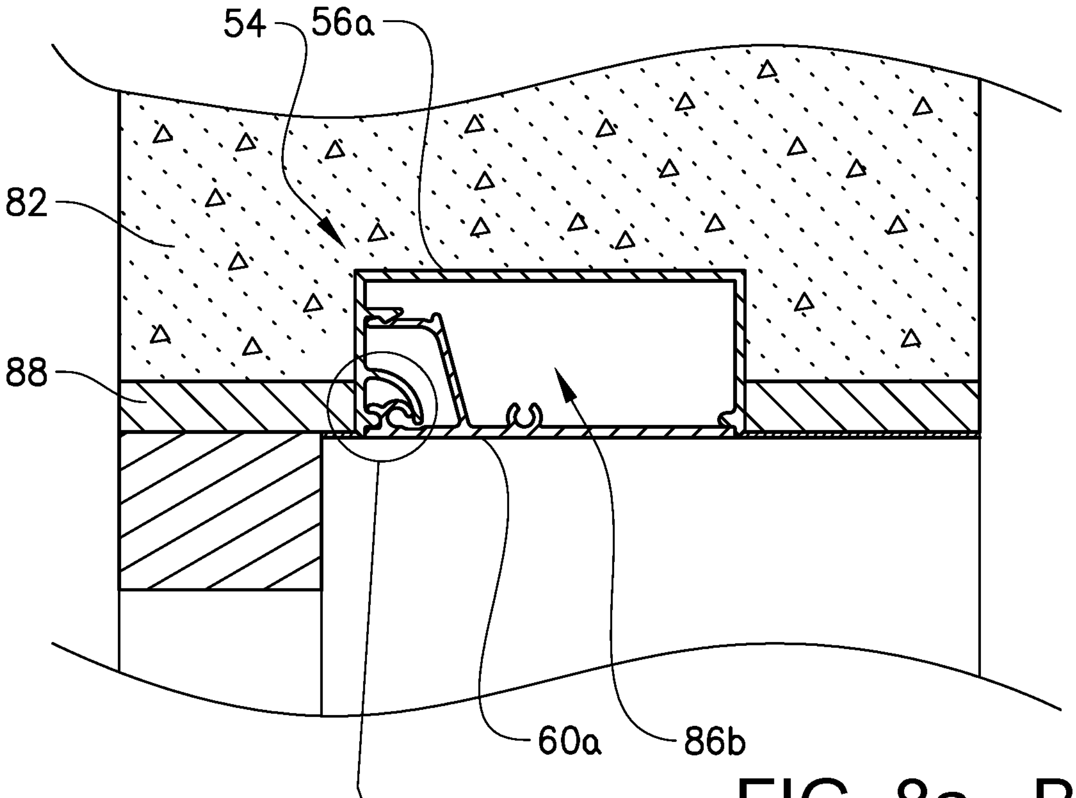
FIGS. 8*a* and 9*a* are cross sections of the arrangement according to FIG. 6 and FIG. 8*b* and FIG. 9*b*, respectively, is an enlarged view of a portion of FIG. 8*a* and FIG. 9*a,*
Figure 8B:
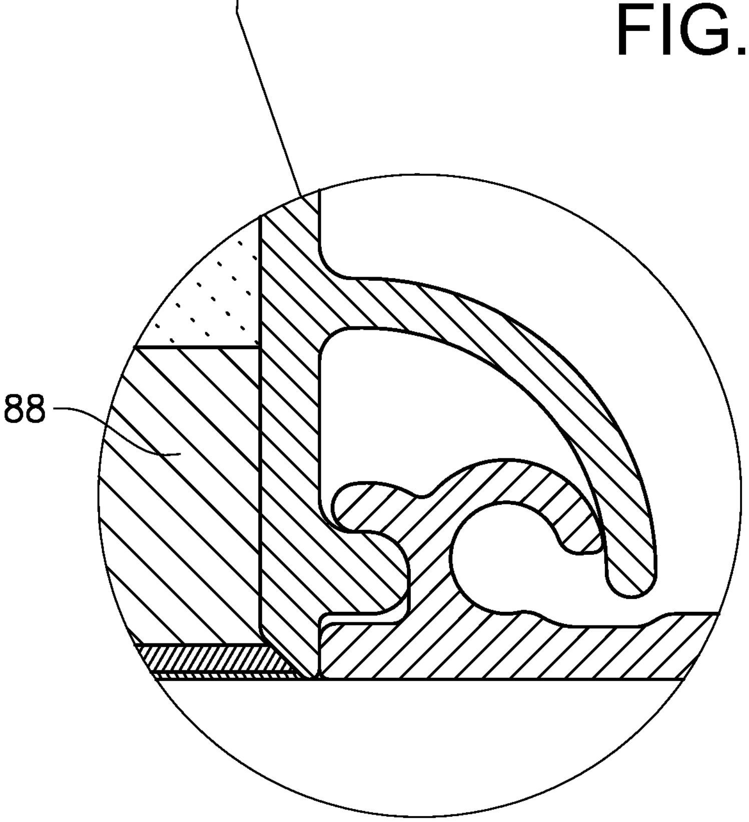
Figure 9B:
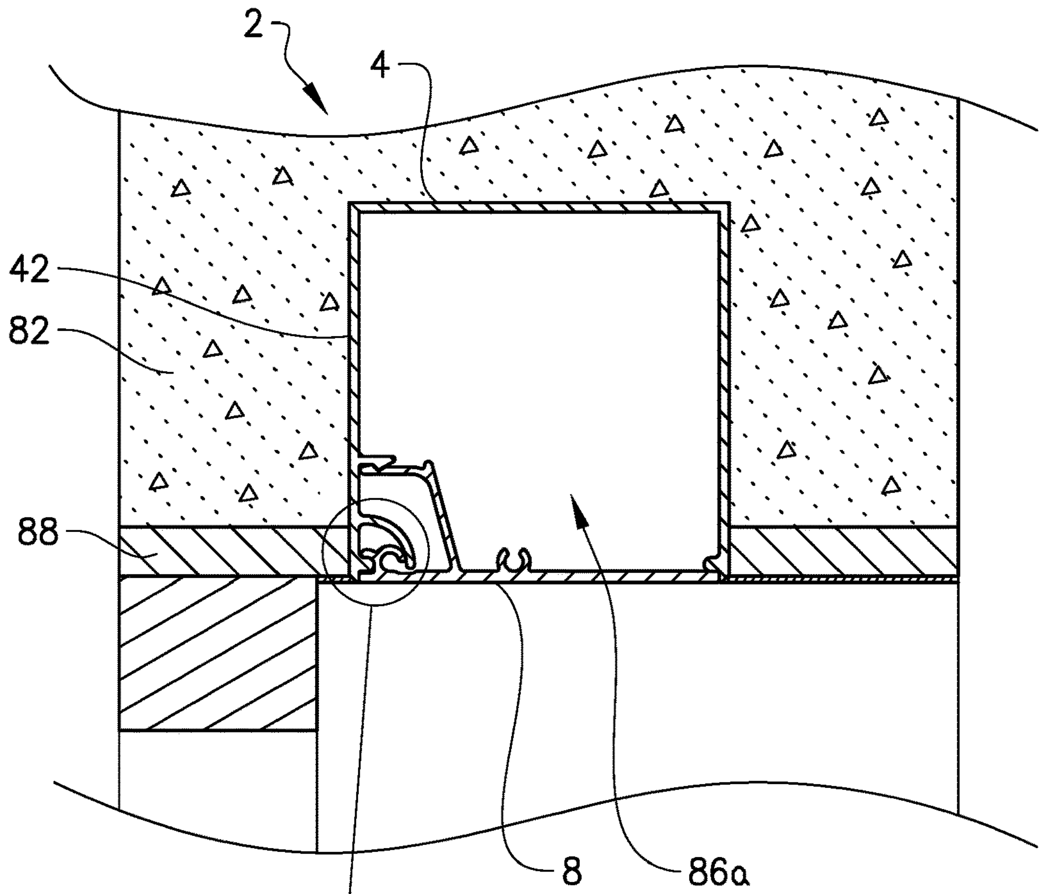
Figure 9B:
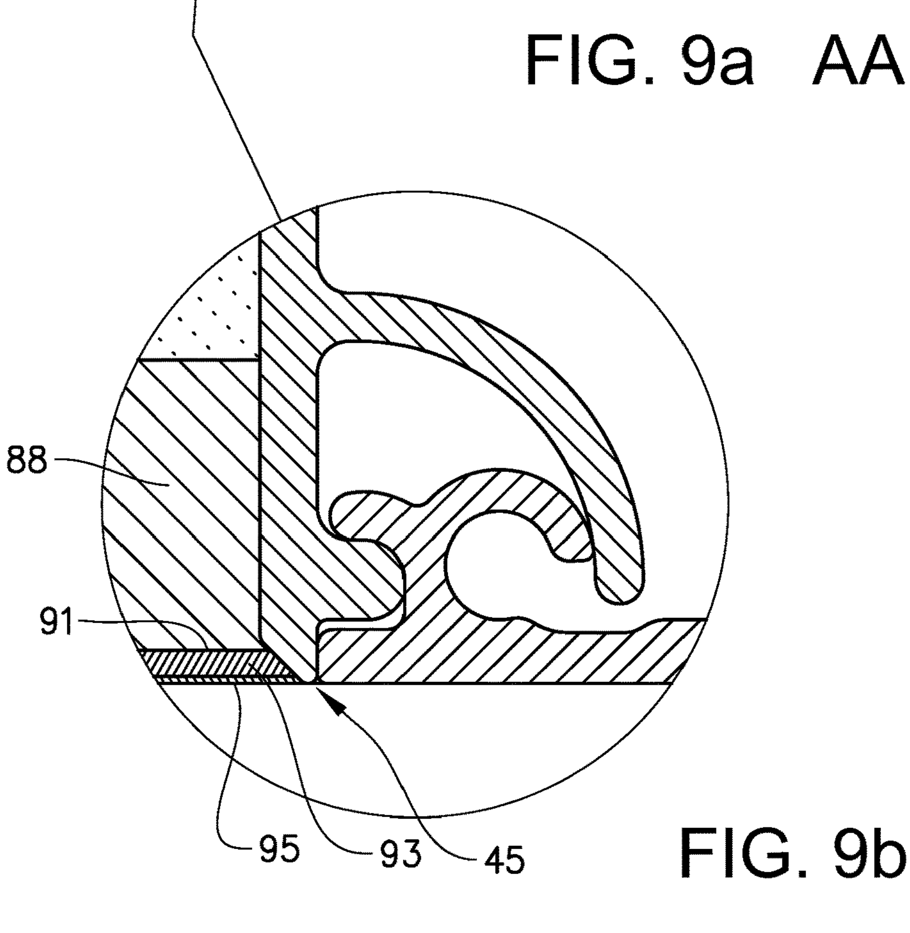

The cover arrangement 80 is arranged in such a way that the elongated support member 4, 56*a*, 56*b* is at least to a great extent and preferably almost entirely received in the groove 86*a*,86*b*, see also FIGS. 8 and 9.

Figure 7:
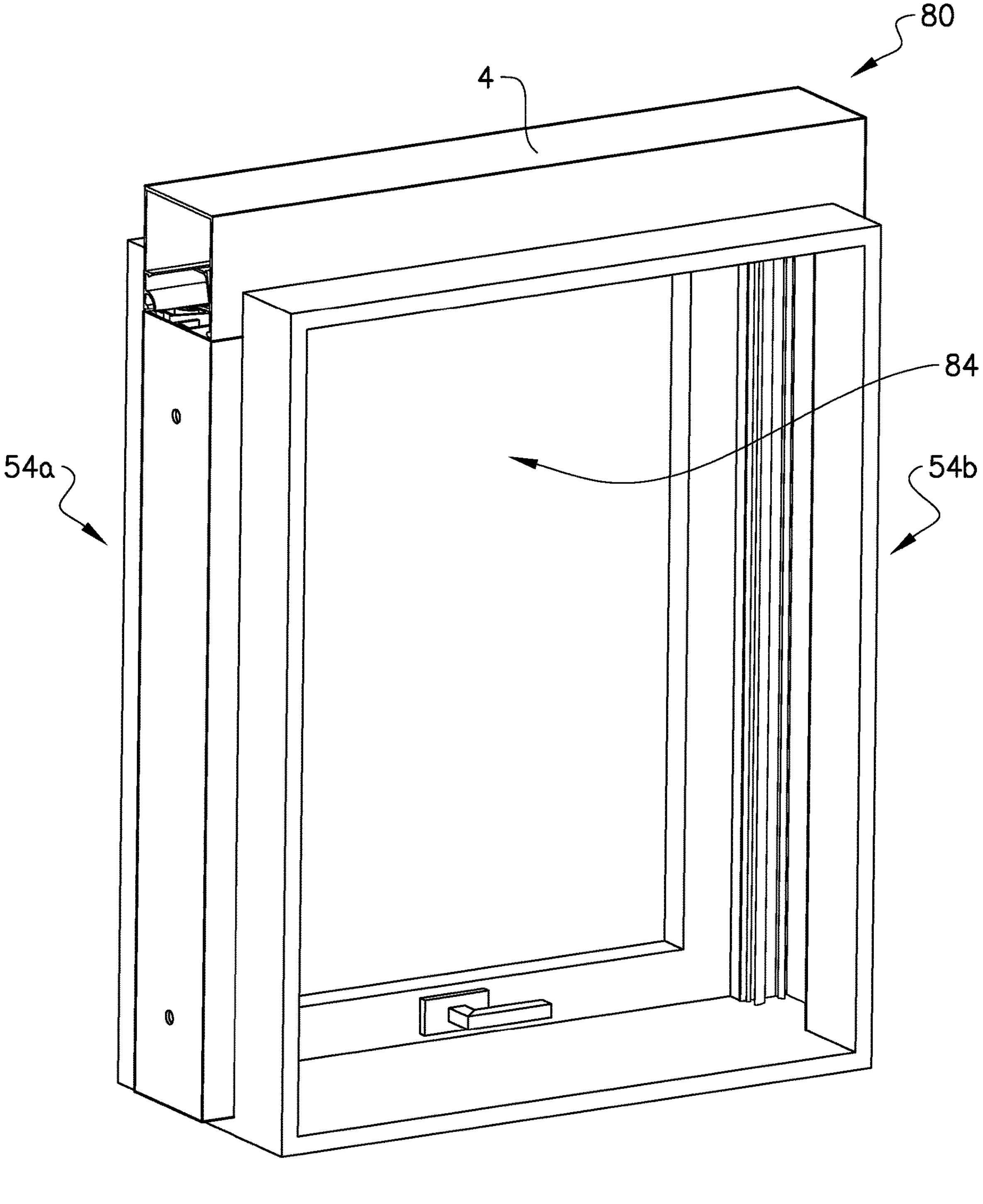
FIG. 7 is a perspective view of the arrangement according to FIG. 6 with elongated covers removed.

FIG. 7 is a perspective view of the wall portion 82 defining the window opening 84 similar to FIG. 6, but with the elongated covers 8, 60*a*, 60*b* removed.

FIGS. 8*a* and 9*a* shows a cross sectional view of a wall portion 82 comprising the cover arrangement 54 according to the second embodiment and the cover arrangement 4 according to the first embodiment, respectively. The wall portion 82 comprises a wall section 88, which may comprise a board, like a plasterboard.

Turning now to the enlargement in FIG. 9*b*, the elongated support member 4 is arranged in such a way that a main side surface of the first plate 42 is in contact with the wall section 88. Further, the elongated support member 4 is arranged in such a way that the edge 45 is positioned at a distance from an exterior surface 91 of the wall section 88 and wherein skim plaster coat 93 is applied between the exterior surface 91 of the wall or roof section and the edge 45 so that a side of the first plate 42 facing the wall or roof section is covered by the skim plaster coat all the way to the edge 45. More specifically, the elongated support member 4 is arranged in such a way that the second side 55 of the first plate 42 faces the wall section.

More specifically, the elongated support member 4 is arranged in such a way that the edge 45 of the first plate 42 projects a small distance from a plane defined by the exterior surface 91 of the wall section. According to the shown example, the elongated support member 4 is arranged in such a way that the edge 45 of the first plate 42 projects a distance smaller than an extension of the edge region 47 in a direction perpendicular to the longitudinal direction L2 of the elongated support member 4 from the plane defined by an exterior surface of the wall or roof section.

More specifically, the skim plaster coat 93 is applied between the exterior surface 91 of the wall section adjacent the first plate 42. Further specifically, skim plaster coat is applied between the exterior surface 91 adjacent the edge 45 so that the projecting part of the second surface of the first plate 42 is covered by the skim plaster coat at least substantially in its entirety. Further, a layer of paint 95 is applied on the skim plaster coat 91.

The elongated support member 56 according to the second embodiment is arranged in the wall portion 82 in a similar way as has been described above for the elongated support member 4 according to the first embodiment, see enlargement in FIG. 8*b*. It will therefore not be further explained here.

Figure 10:
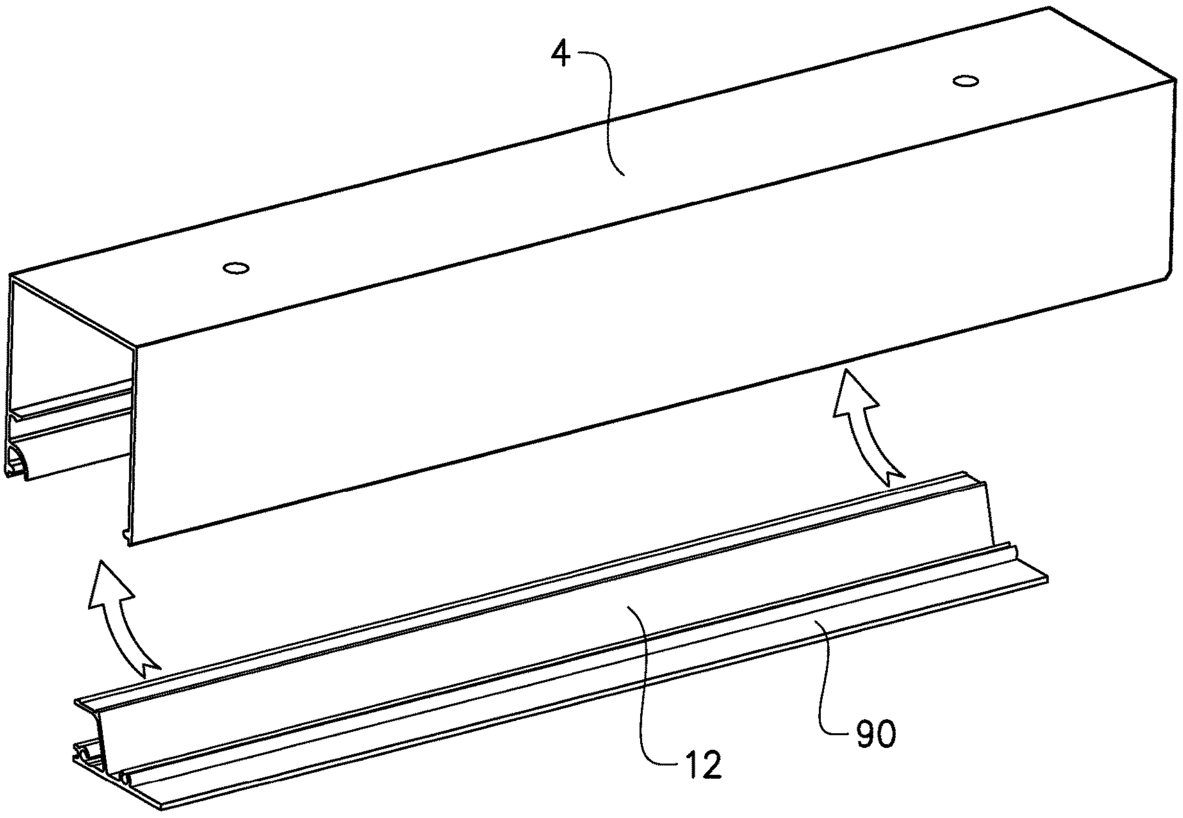
FIG. 10 is a perspective view of a new cover for replacing the cover according to FIG. 1-2.

FIG. 10 shows a cover 90 adapted for replacing the first applied elongated cover 8. The cover 90 is provided with an engagement means 12 similar to the engagement means of the first applied elongated cover 8. The elongated cover 90 has a smaller extension transverse to the longitudinal direction than the cover 8, wherein it is adapted for forming a gap between its free end and the adjacent plate of the support member for receiving an edge of the extendable covering.

Figure 11:
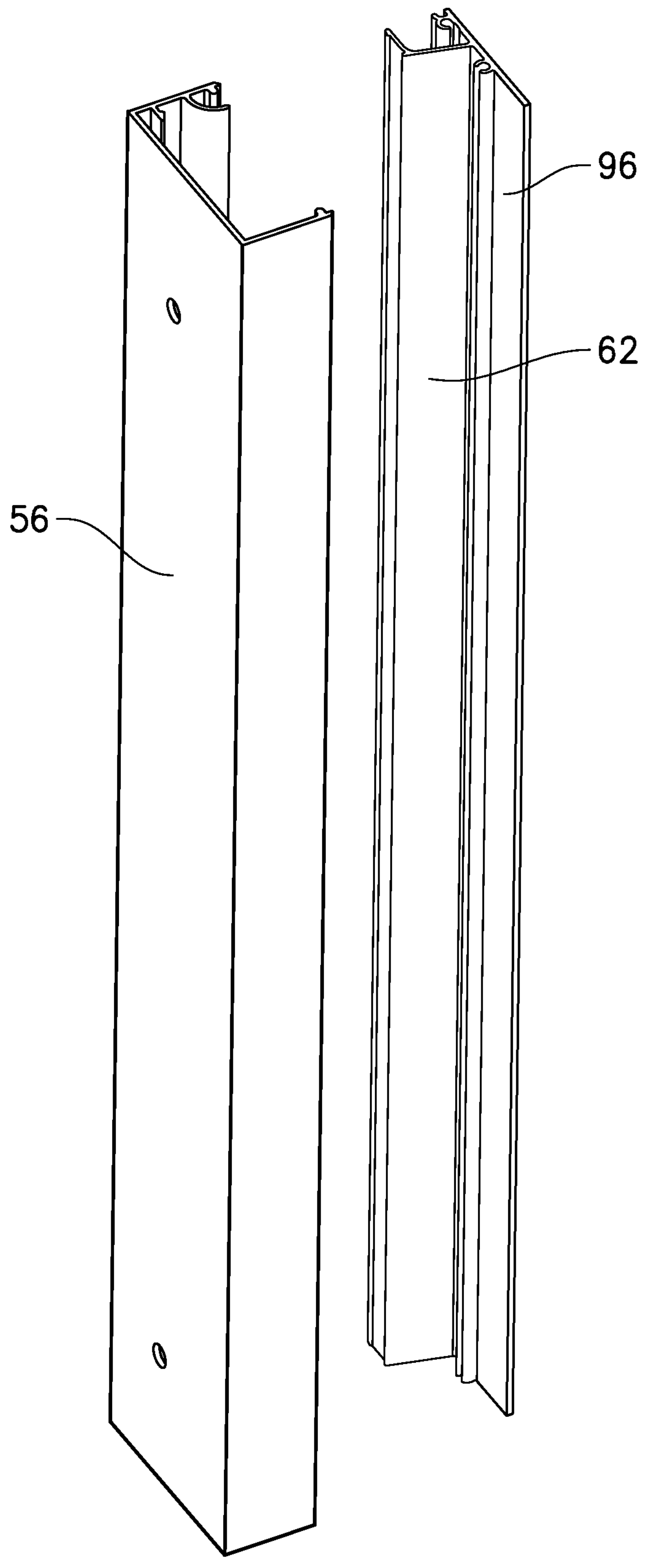
FIG. 11 is a perspective view of a new cover for replacing the cover according to FIG. 3-4.

FIG. 11 shows a cover 96 adapted for replacing the first applied elongated cover 58. The elongated cover 96 is provided with engagement means 62 similar to the engagement means of the first applied elongated cover 58. The elongated cover 96 has a smaller extension transverse to the longitudinal direction than the cover 58, wherein it is adapted for forming a gap between its free end and the adjacent plate of the support member for receiving an edge of the extendable covering between its free end and the adjacent plate of the support member.

Figure 12:
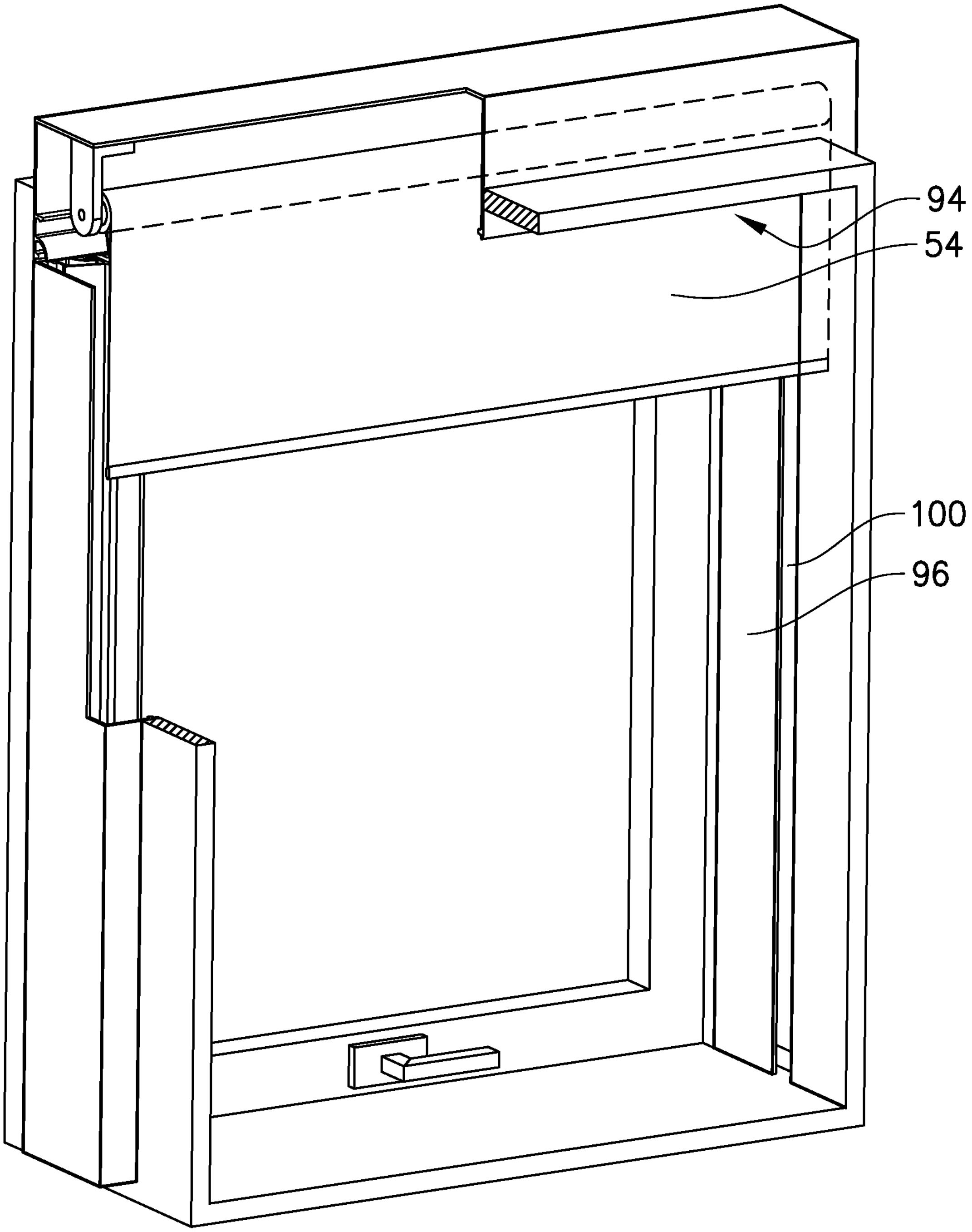
FIG. 12 is a perspective view similar to FIG. 6 with a covering installed and the elongated covers according to FIG. 10-11 installed.

FIG. 12 is a perspective view similar to FIG. 6 with covers 90,96 according to FIG. 10-11 installed. The elongated cover 96 for the sideways elongated support member is designed so that a gap/slot 100 is in alignment with a gap/slot 94 at the upper support member.

Figure 13A:
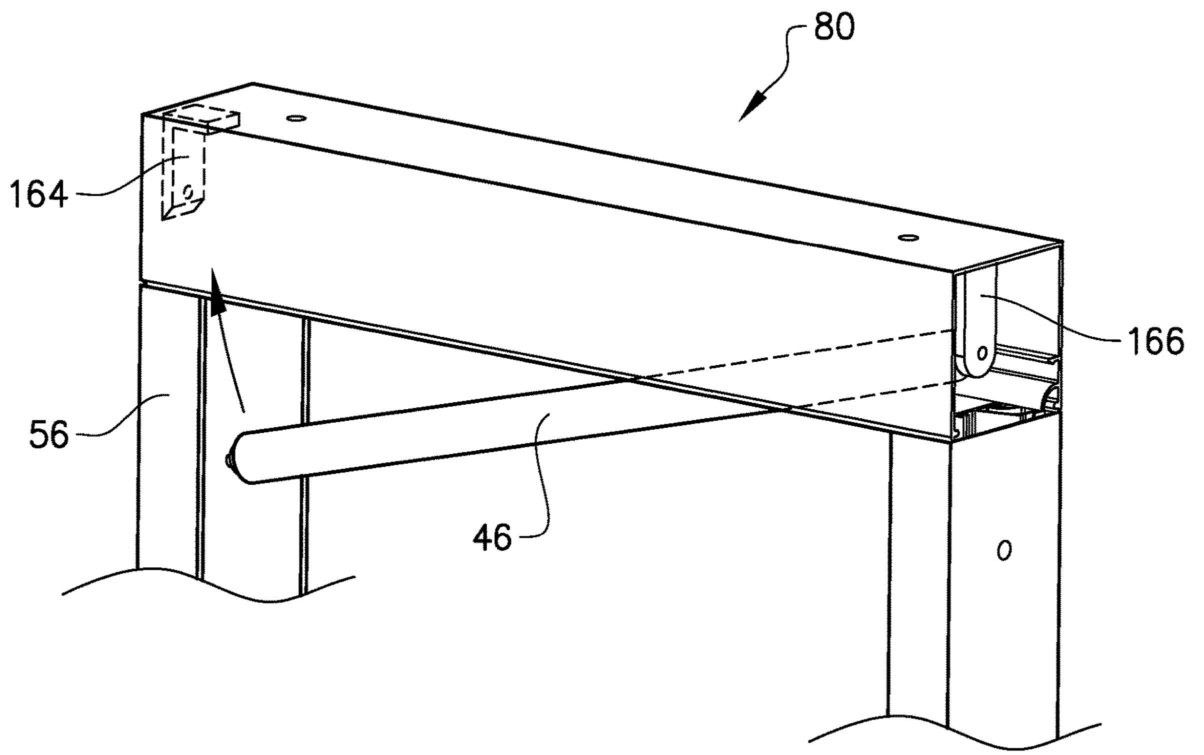
FIGS. 13*a* and 13*b* show a step during mounting of a covering in a cover arrangement.
Figure 13B:
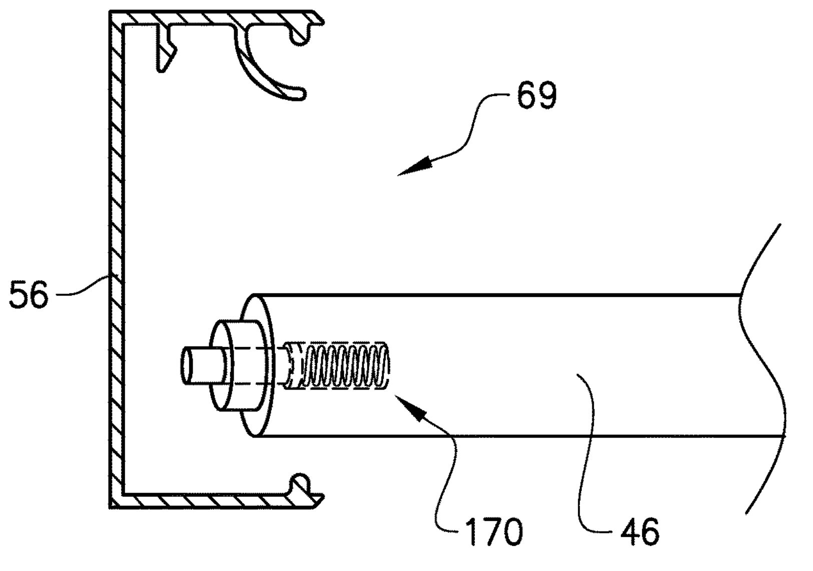

FIG. 13*a* and FIG. 13*b* show a step of mounting the covering 46 to the cover arrangement 80 according to FIG. 6. The cover arrangement comprises at least one means 164,166 for holding the extendable covering 46. In a first step, the holding means 164,166 for the covering 46 are mounted to the upper elongated support member 4 (and/or to the wall portion). Further, the covering 46, which is rolled onto a roll, is first engaged with one end in one of the holding means 166 in an inclined state and then pivoted so that the other end is engaged with the other holding means 164. The sideways elongated support member 56 has a shape allowing an end of the covering 46 to project into its elongated aperture 69. Further, the covering 46 may have a spring biased mechanism 170 at the other end for engaging the associated mounting.

The at least one means 164,166 for holding the extendable covering 46 may be provided in the cover arrangement 80 before it is installed in the wall or roof portion, or alternatively be arranged at a later stage when it is decided to use the cover arrangement 80 for a covering solution. Further, the cover arrangement 80 allows for installing different types of coverings 46 and associated holding means 164, 166. Further, the cover arrangement 80 allows for installing a single covering or a plurality of coverings 46. The holding means 164,166 may be formed by brackets.

Figure 14:
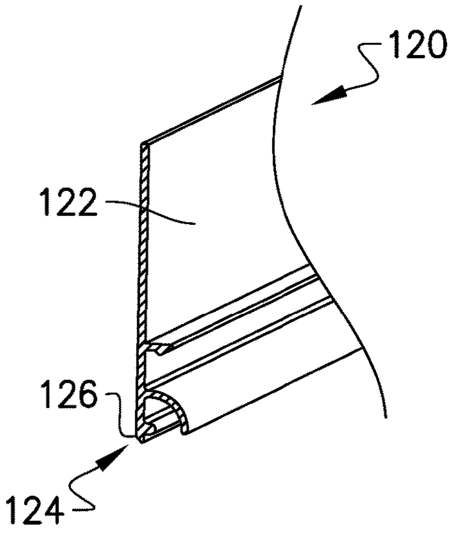
FIGS. 14, 15 and 16 are perspective cut views of three embodiments of an elongated support member.

FIG. 14 is a perspective cut view of a further embodiment of an elongated support member 120. The elongated support member 120 comprises a single plate 122 comprising pivot means and engagement means as has been described above. A section 124 of the first plate 122 is tapering towards an edge 126 of the plate 122 in a similar manner as has been described above for the elongated support member 4 according to the first embodiment. It will therefore not be further explained here. The elongated support member 120 may be fastened to the wall or roof via the first plate 122 in a similar fashion as has been described above.

Figure 15:
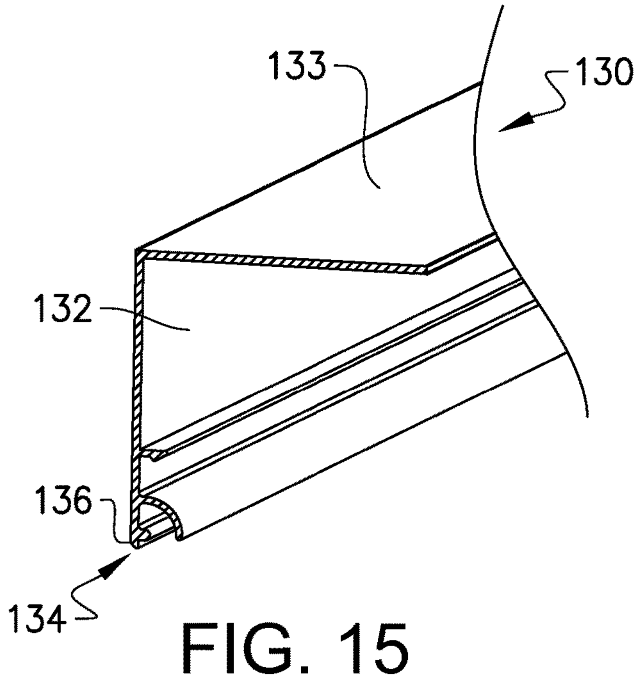

FIG. 15 is a perspective cut view of a further embodiment of an elongated support member 130. The elongated support member 130 comprises a first plate 132 and a second plate 133 arranged perpendicularly to the first plate 132. The first plate 132 and the second plate 133 are formed in a one-piece unit. The first plate 132 comprising pivot means and engagement means as has been described above. A section 134 of the first plate 132 is tapering towards an edge 136 of the plate 132 in a similar manner as has been described above for the elongated support member 4 according to the first embodiment. It will therefore not be further explained here. The elongated support member 120 may be fastened to the wall or roof via the second plate 133 in a similar fashion as has been described above.

Figure 16:
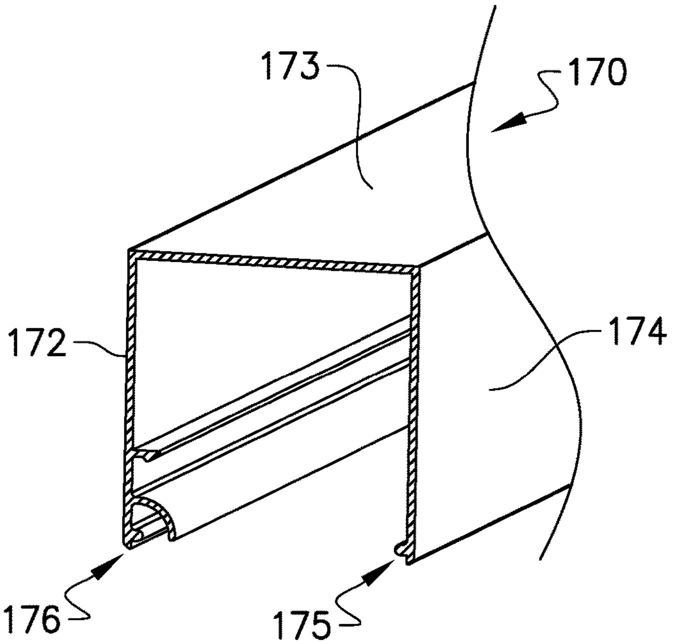

FIG. 16 is a perspective cut view of a further embodiment of an elongated support member 170. The elongated support member 170 comprises a first plate 172, a second plate 173 arranged perpendicularly to the first plate 172 and a third plate 174 arranged in parallel with the first plate 172. The first plate 172, the second plate 173 and the third plate 174 are formed in a one-piece unit. The first plate 172 comprises pivot means and engagement means as has been described above. A section of the first plate 172 and the third plate 174, respectively, is tapering towards an edge 175,176 in a similar manner as has been described above for the elongated support member 4 according to the first embodiment. It will therefore not be further explained here. The elongated support member 170 may be fastened to the wall or roof via the second plate 173 in a similar fashion as has been described above.

Figure 17:
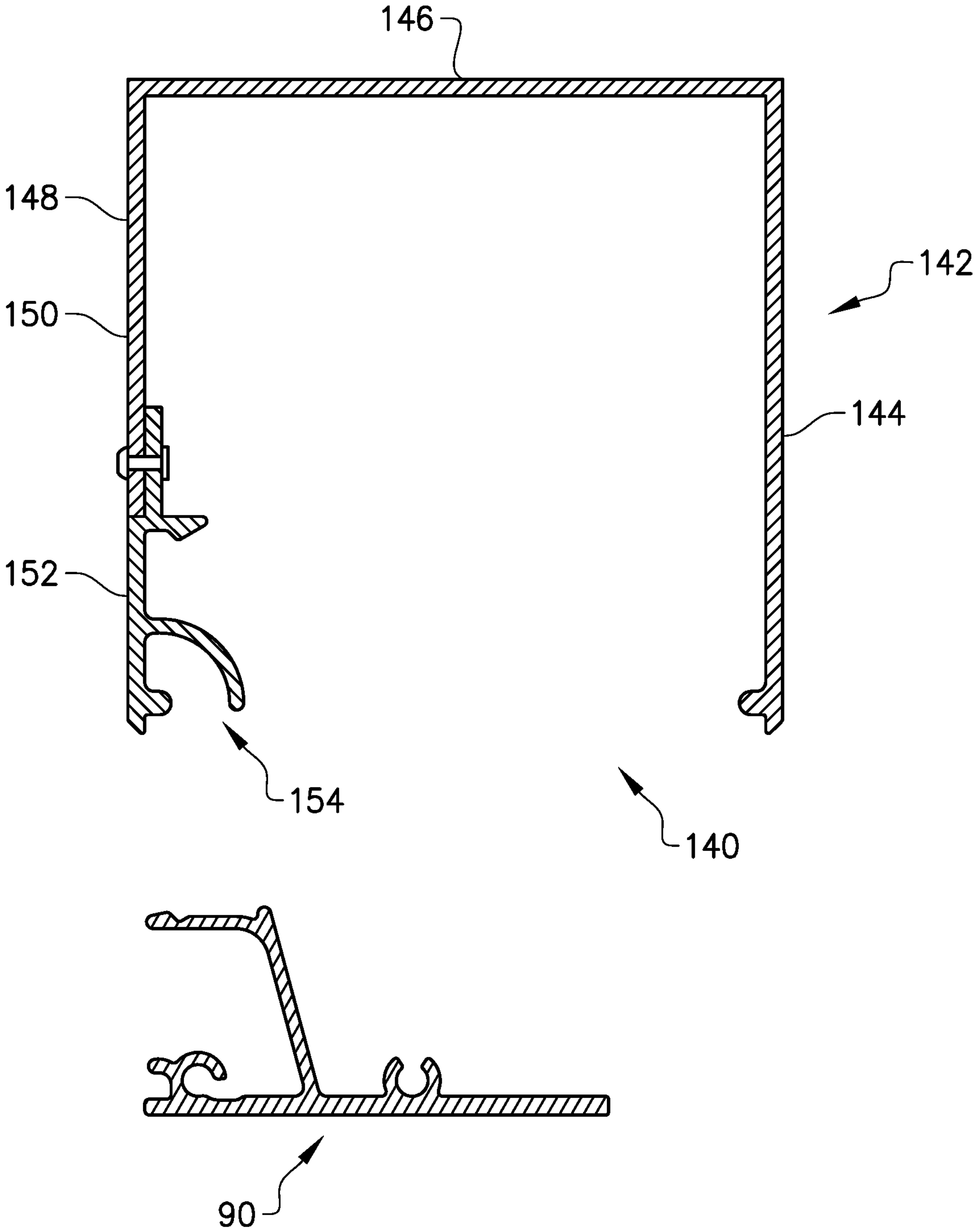
FIG. 17 is a cross sectional view of a cover arrangement according to a further embodiment.

FIG. 17 is a cross section view of a cover arrangement 140 according to a further embodiment. More specifically, it is a variant of the cover arrangement 2 according to the first embodiment. The cover arrangement 140 comprises an elongated housing 142. The elongated housing 142 comprises a first plate 148, a second plate 146 arranged perpendicularly to the first plate 148 and a third plate 144 arranged in parallel with the first plate 148. The third plate 144, the second plate 146 and the first plate 148 are formed in a one-piece unit.

An elongated support member 152 is attached to a long side edge of the first plate 148. The elongated support member 152 comprises two plate sections in a one-piece unit, wherein the plate sections are parallel and displaced relative to one another for achieving an overlapping relationship with the plate 148. The support member 152 comprises pivot means and engagement means as has been described above. Further, the support member 152 comprises an edge similar to the edge 45 described above. The two parts 148,152 have overlapping sections and are firmly joined via a rivet connection. The cover arrangement 140 further comprises the cover 90 as described above.

Figure 18:
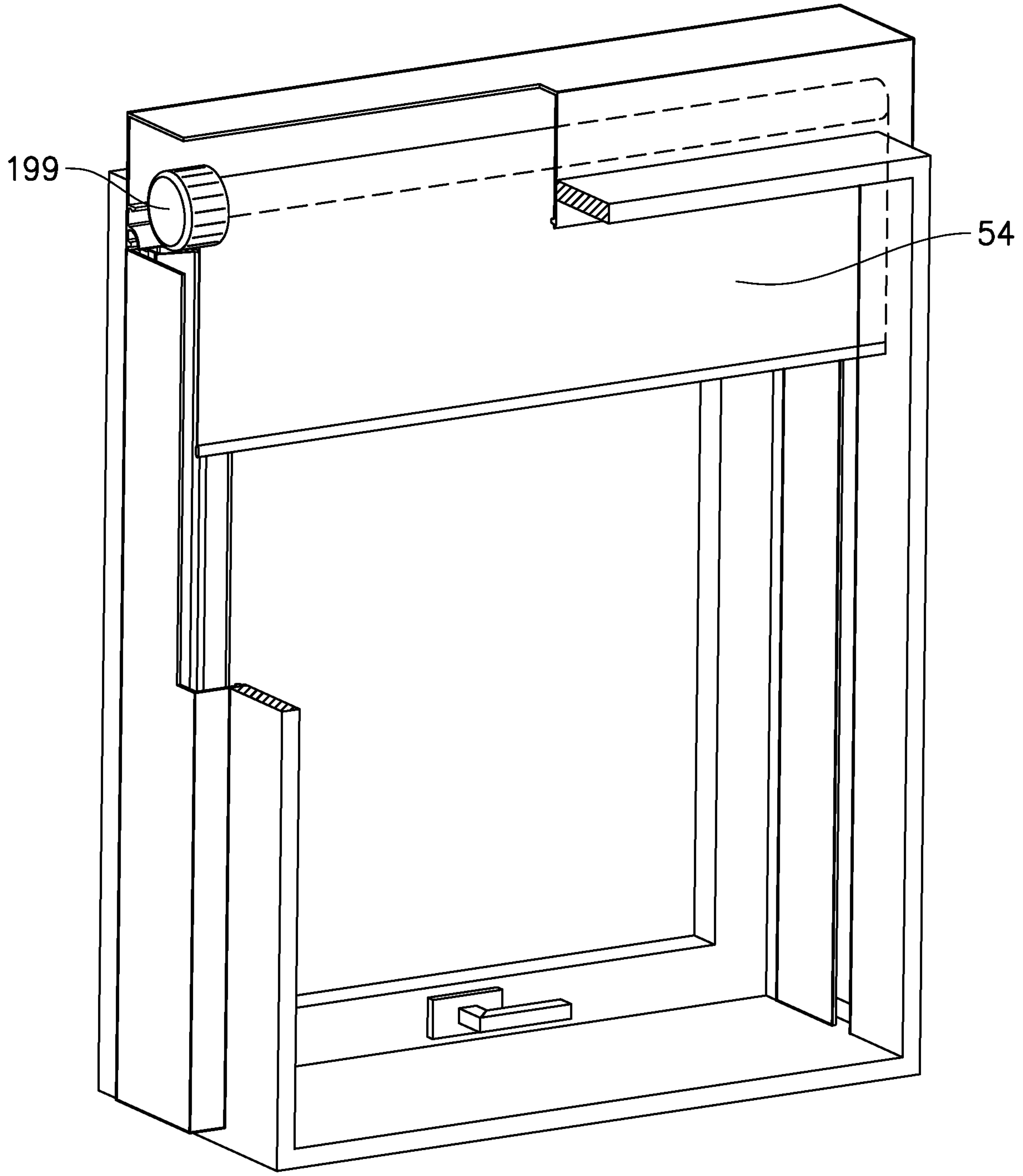
FIG. 18 shows a cover arrangement with a motorized covering applied.

FIG. 18 discloses that the cover arrangement may comprise a motor 199 for operating the covering(s) 54 between the retracted state and the extended state.

Figure 19:
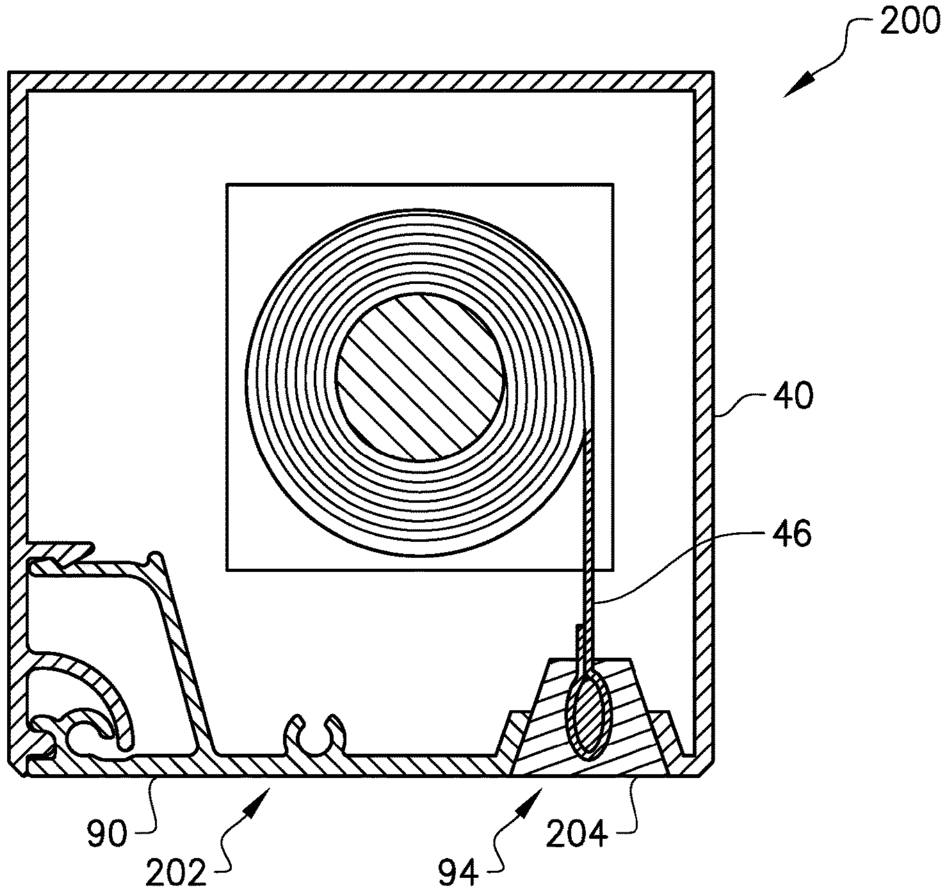
FIG. 19-22 show a further embodiment of a cover arrangement in different views.

FIG. 19 shows a cover arrangement 200 according to a further embodiment forming an alternative to the cover arrangement 2 according to the first embodiment shown in FIG. 1-2. The cover arrangement 200 is shown in cross section with a covering 46 applied. The cover arrangement 200 comprises a closing structure 202, which in turn comprises an elongated cover member 204, which is attached to an edge of the covering 46. Further, the elongated cover member 204 and the at least one elongated cover 90 being designed so that the elongated cover member 204 at least substantially blocks a passage for the covering passed the at least one elongated cover when the covering is in the retracted state.

The elongated cover member 204 has an exterior shape and dimension matching the adjacent parts of the elongated cover 90 and the support member defining the slot 94. More specifically, the parts defining the slot 94 forms a narrowing passage for guiding the elongated cover member 204 to a seat. Further, the elongated cover member 204 has an exterior tapering shape for matching with the narrowing passage. More specifically, the elongated cover member 204 has the shape of a truncated cone.

Figure 20:
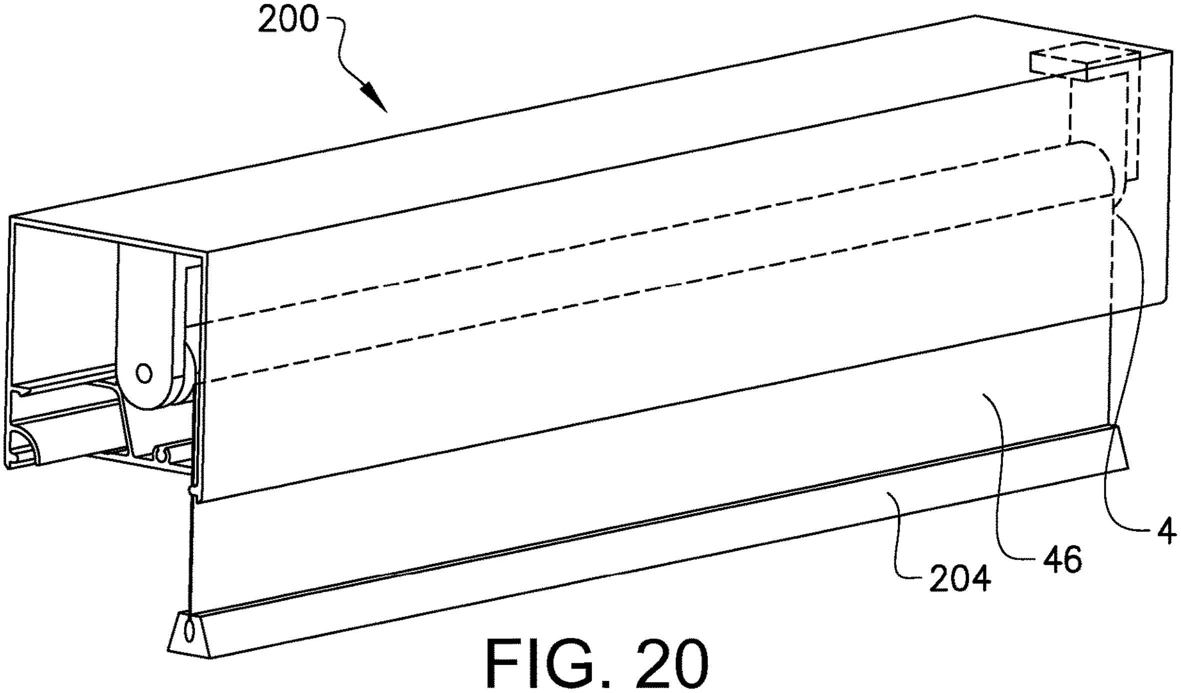
Figure 21:
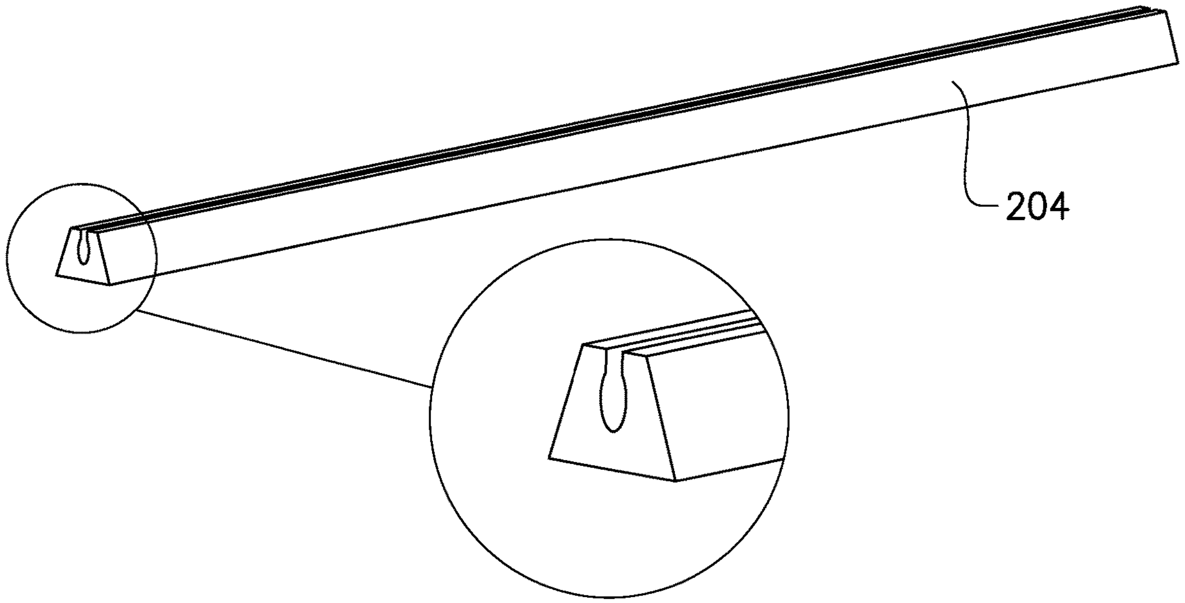
Figure 22:
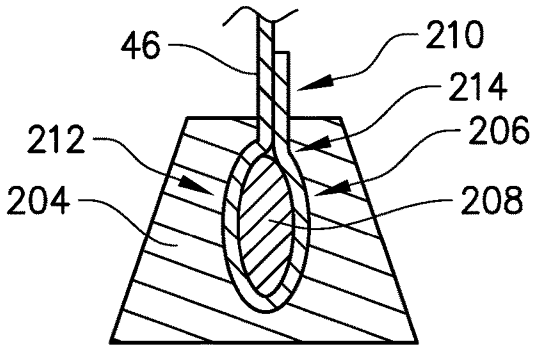

FIG. 20 shows the cover arrangement 200 according to FIG. 19 in a perspective view, wherein the covering 46 is partly extended. FIG. 21 shows the elongated cover member 204 in a perspective view. FIG. 22 shows the edge 206 of the covering 46 extending perpendicular to an extension direction of the covering between the retracted state and the extended state. An end of the fabric of the covering forms a loop around a pin 208 and is fastened via stitches, glue or similar 210. The elongated cover member 204 comprises a channel 212 for receipt of the covering edge 206. The channel 212 has a narrow portion 214 for a firm attachment of the elongated cover member 204 to the covering 46.

Figure 23:
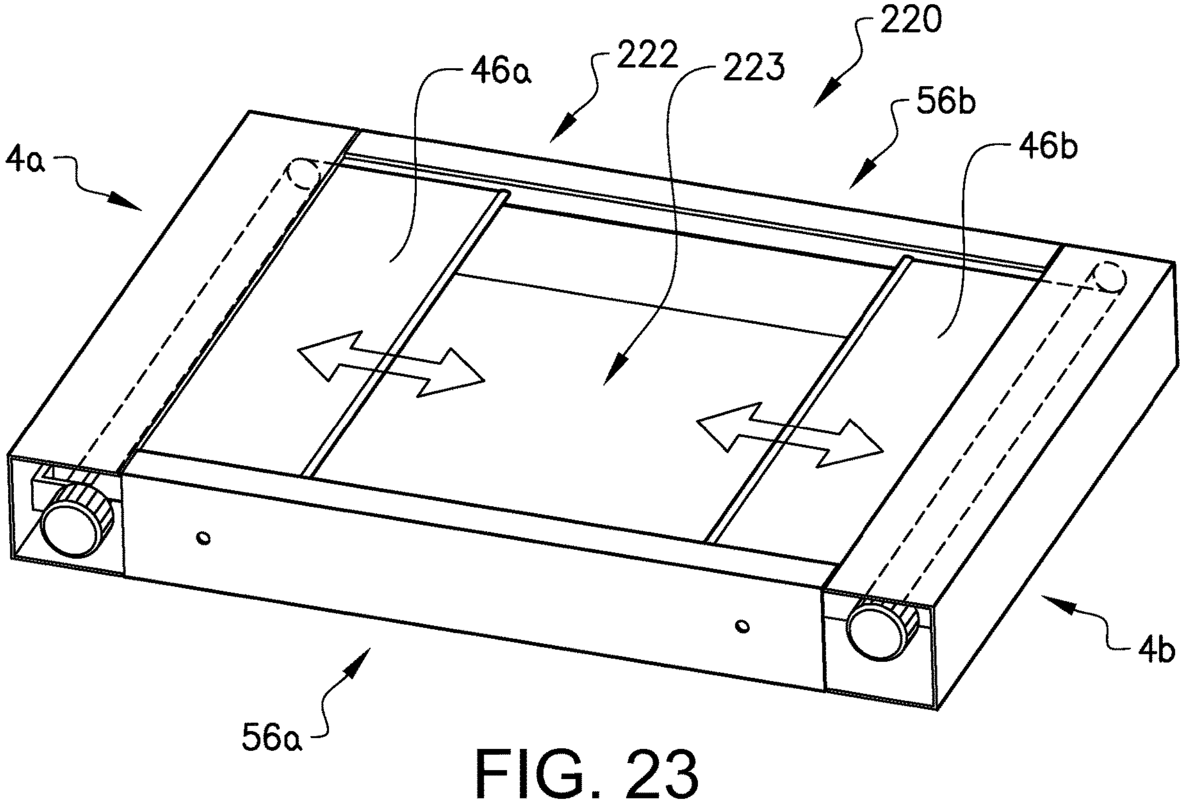
FIG. 23 shows a cover arrangement applied in a roof opening according to a first embodiment.

FIG. 23 shows a roof portion 220 comprising a cover arrangement 222 according to a further embodiment. It is a so called skylight design. The cover arrangement 222 is an alternative to the cover arrangement according to FIG. 6. Only the main differences will be described below. The cover arrangement 222 comprises a further elongated support member **4*b* accommodating a further covering 46*b* arranged opposite the elongated support member 4*a* accommodating the covering 46*a* in relation to a window opening 223 so that the apertures for the coverings 46*a*, 46*b* face each other. In other words, the cover arrangement 222 forms a frame with a rectangular shape, wherein the cover arrangement 222 extends along all four sides of the rectangle. According to the example in FIG. 23, the two coverings 46*a*, 46*b* extend along the same slot in the sideways cover arrangements. Thus, the facing edges of the two coverings 46*a*, 46*b* may meet when the coverings jointly cover the window opening. According to an alternative, the sideways cover arrangements are provided with two slots, one for each covering 46*a*, 46*b***, so that each covering may extend for completely covering the roof opening.

Figure 24:
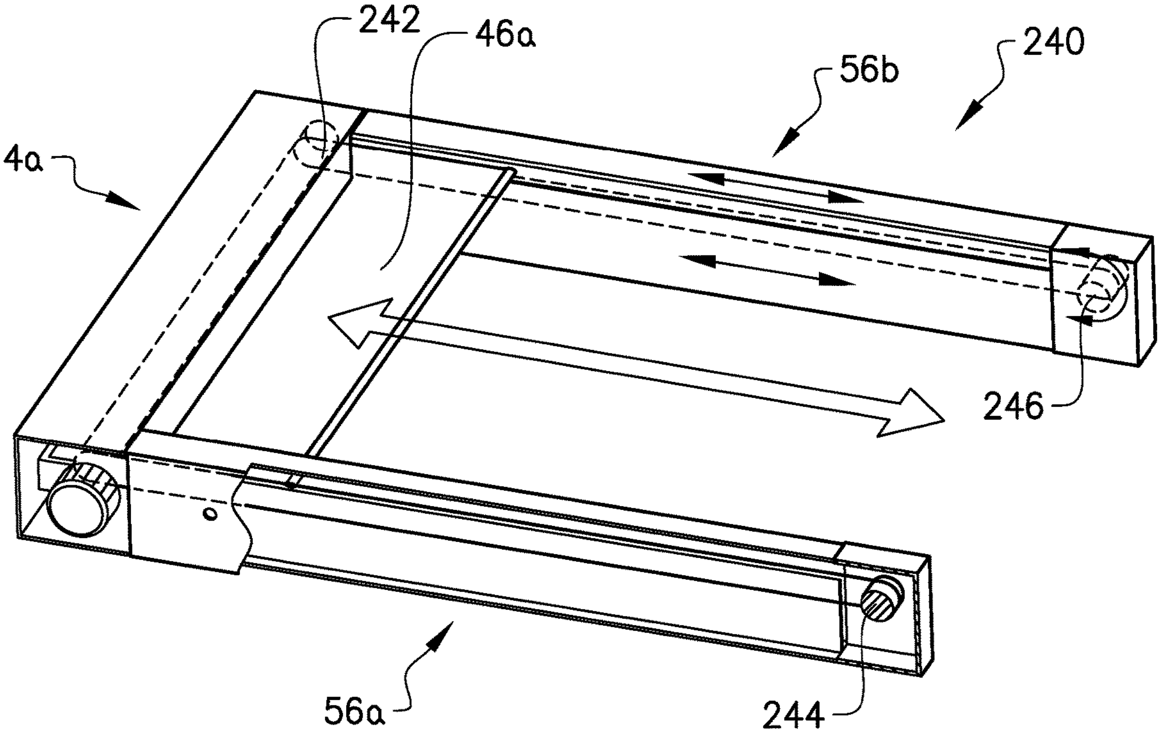
FIG. 24 shows a cover arrangement according to an alternative to FIG. 23.

FIG. 24 shows an alternative cover arrangement 240 similar to the one shown in FIG. 23, but without the further elongated support member **4*b* for accommodating a further covering 46*b*. More specifically, the covering 46*a* is rolled on a roll 242 rotatably arranged inside the associated elongated support member. A roll member 244, 246 is arranged at an opposite end of each one of the sideways elongated support members, wherein a cord from the roll forms a loop around its associated roll member 244,246. The covering 46*a*** is attached to the cords for extension and retraction along the cord extension.

FIG. **25*a-d* shows a cover arrangement 300 according to a further embodiment, which is an alternative to the one shown in FIG. 17, in different stages of connection. Only the main differences will be described below. The cover arrangement 300 comprises an elongated support member 352 and an elongated plate shaped cover 390. Each one of the support member 352 and the cover 390 comprises a pivot means 309,311 for forming a pivot axis when engaged so that the cover 390 may be pivoted between a non-connected state and a connected state in relation to the support member 352. The pivot means 309,311 comprises engaging hooks. Further, the pivot means 309,311 is elongated and extends in parallel with the longitudinal direction of the support member and cover, respectively. Further, the support member 352 comprises an elongated projection 354 extending from a plate shaped element 358 and in parallel with a longitudinal direction of the support member. The projection 354 has a curved shape forming an elongated receptacle 356 for an edge section of the cover 390 during connection and disconnection. More specifically, the receptacle 356 is defined by the projection in one direction and by the plate shaped element 358 of the support member 352 in the other direction. Further, the receptacle 356 is open downwards for receiving the edge section of the cover 390 during connection and disconnection. The projection comprises the hook 309** at the free end, wherein the hook extends into the receptacle.

The cover 390 comprises an elongated projection 360 extending from a plate shaped element 362 and in parallel with a longitudinal direction of the cover 390. The projection 360 has a curved shape forming the hook 311 and is arranged in the vicinity of a long side edge 364 of the cover. More specifically, the hook 311 projects away from the adjacent edge of the cover 390. Due to this design, the pivot axis will be positioned at a distance from the adjacent edge of the cover, wherein a facilitated disconnection may be achieved, see further below.

The distance between a free end of the hook 309 of the support member and an interior surface of the plate shaped element 358 of the support member 352 perpendicular to a plane in parallel with the plate shaped element 358 of the support member 352 is about the same as or larger than an extension of the cover at the projection 360 in a direction perpendicular to a plane in parallel with the plate shaped element 362 of the cover 390 for allowing introduction of the edge section of the cover during connection.

Each one of the support member 352 and the cover 390 comprises an engagement means, which in turn comprises a first engagement portion 310, 312 of the same type as has been described above for engagement with each other. Further, the engagement means comprises a second engagement portion 354 for pushing the cover against the edge section of the support member. The second engagement portion is formed by the projection 354 effecting the cover via the hooks 309,311.

Figure 25A:
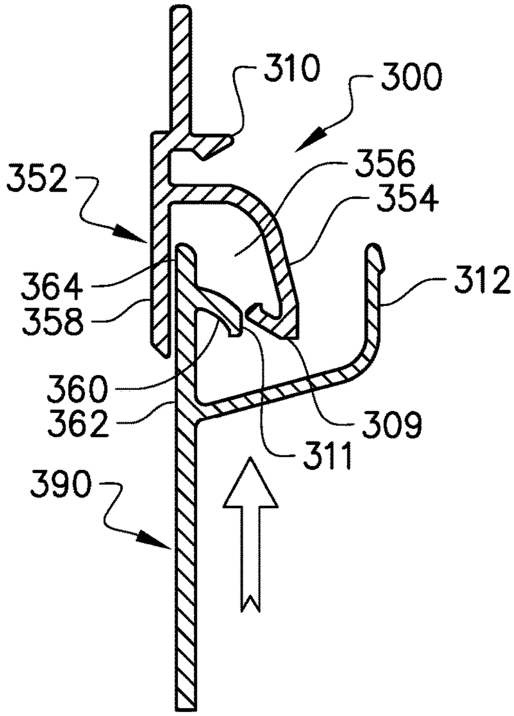
FIG. 25*a-d* shows a cover arrangement according to a further embodiment in different stages of connection.
Figure 25B:
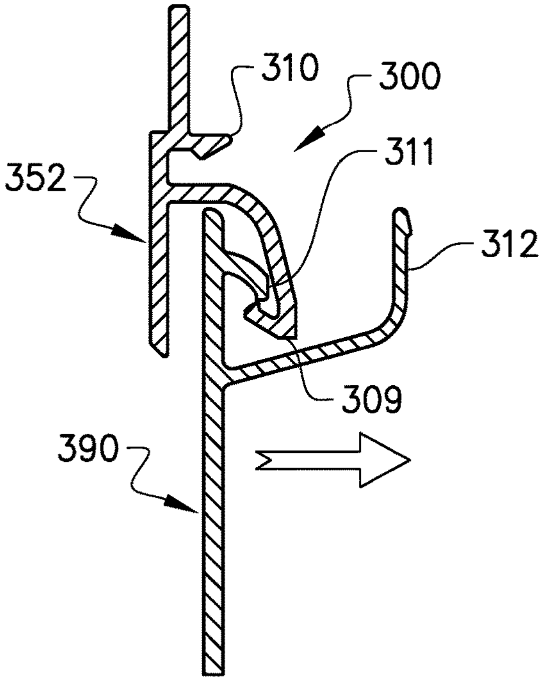

The arrow in FIG. 25*a* shows a movement direction of the cover 390 in relation to the support member 352 in an initial stage of connection. More specifically, the cover 390 is directed so that its long side edge and the projection 360 is introduced into the receptacle 356 of the support member 352. More specifically, the cover 390 is directed so that its plate shaped element 362 is substantially in parallel with the plate shaped element 358 of the support member 352. Further, the cover 390 is moved in this direction until the hook 311 has passed the hook 309 of the support member. FIG. 25*b* shows a stage where the cover 390 has been moved in a direction perpendicular to the longitudinal direction of the support member 352 away from the plate shaped element 358 so that the hooks 309, 311 engage with each other, see arrow.

Figure 25C:
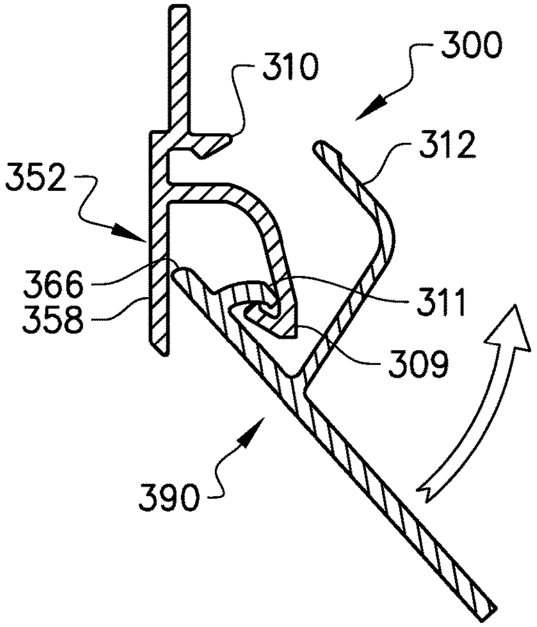
Figure 25D:
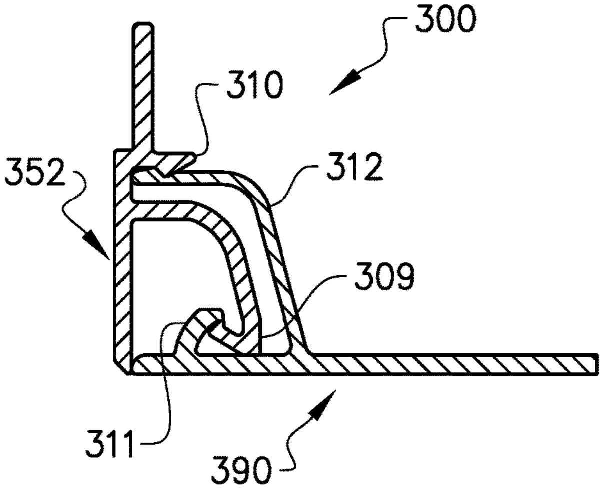

FIG. 25*c* shows a stage where the cover 390 has been turned around a pivot axis formed by the engaging hooks 309,311, see arrow. A long side edge 366 of the plate shaped element 362 of the cover 390 will then contact the interior surface of the plate shaped element 358 of the support member 352 within the receptacle and the projection 354 of the support member 352 will flex somewhat during a further turning of the cover 390 to its final position shown in FIG. 25*d*, wherein a tight fit will be achieved between the edge of the cover 390 and the interior surface of the plate shaped element 358 of the support member 352.

For releasing (disconnecting) the cover 390 from the support member 352, it may be possible to push the cover 390 on its exterior side at the edge section with the projection 360, wherein a turning movement around the pivot axis defined by the pivot means 309,311 is achieved. Alternatively, or as a complement, a tool, as described above, may be squeezed in between the cover 8 and the support member 4 at the opposite long side edge of the cover in relation to the pivot axis and by turning the tool, the long side edge may be accessible for further turning of the cover 8 around the pivot axis.

Figure 26:
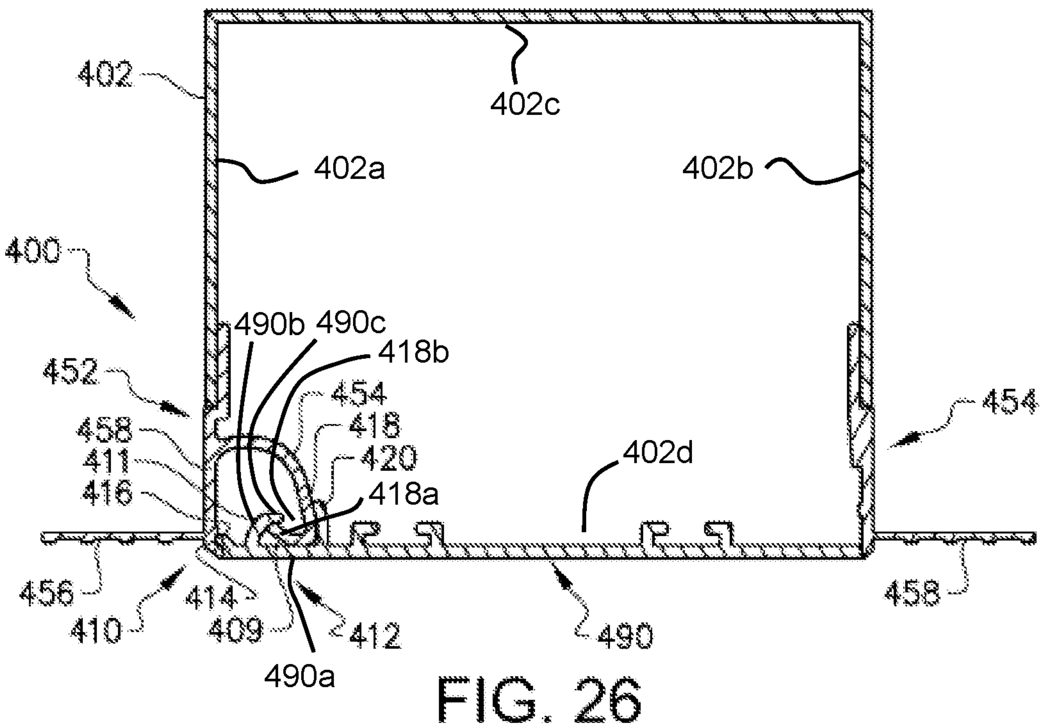
FIG. 26 shows a cover arrangement according to a further embodiment.

FIG. 26 shows a cover arrangement 400 according to a further embodiment, which is an alternative to the one shown in FIG. 25. Only the main differences will be described below. The cover arrangement 400 comprises an elongated support member 452 and an elongated plate shaped cover 490. Each one of the support member 452 and the cover 490 comprises a pivot means 409,411 for forming a pivot axis when engaged so that the cover 490 may be pivoted between a non-connected state and a connected state in relation to the support member 452. The pivot means 409,411 comprises engaging hooks.

Each one of the support member 452 and the cover 490 comprises an engagement means 410,412 for forming a snap connection. The engagement means 410 of the support member comprises a first engagement portion 414 in the form of a groove arranged at an edge of the support member and extending in a longitudinal direction of the support member for forming a locking engagement between the cover and the support member in the connected state. The groove is defined on each side by a raised portion. Further, the engagement means 412 of the cover comprises an elongated projection 416 at a free longitudinal end of the cover for being received in the groove in the support member. Thus, the cover may be snapped into engagement with the support member when the elongated projection passes the raised portion and ends up in the groove.

Each one of the support member 452 and the cover 490 comprises a second engagement portion 418, 420 for engagement with each other. The second engagement portion or support member projection 418 of the support member 452 is formed by a surface of the hook-shaped pivot means facing away from the pivot. The pivot means 409, 411 includes, on the support member 452, a base member 458, a support member projection 418 attached at a first end of the support member projection 418 to the base portion 458 and arranged inside of the housing, and a tip portion 418*a* having a first end attached at a second end of the support member projection. The support member projection 418 defines, with the base portion 458, a receptacle, the tip portion 418*a* extending toward the first end of the support member projection so that the tip portion and the support member projection form a channel 418*b* having an open end facing an interior of the receptacle. The first engagement portion 420 of the cover 490 is formed by a protrusion on an interior side of the cover and at a distance from the pivot means 411 sufficient for housing the hook-shaped pivot means 411 of the support member therebetween. The cover 490 includes a web portion 490*a* and a cover projection 490*b*, the cover projection being curved and having a cover projection free end 490*c*, the cover projection free end is disposed in the channel 418*b* at least when the cover is in the open position.

More specifically, the hook shaped pivot means 409 of the support member is arranged at a distance from the groove 414 in a direction perpendicular to a plane defined by the plate shaped member of the support member allowing introduction of the edge section of the cover during connection.

Further, the cover arrangement 400 comprises an elongated housing 402 with a U-shaped cross sectional shape having a first leg or lateral edge 402*a*, a second leg or lateral edge 402*b*, a web or inner edge 402*c* connecting first ends of the first leg or lateral edge and the second leg or lateral edge, and an open end 402*d* between second ends of the first leg and the second leg. The support member 452 is attached to a long side edge of a first plate of the housing. Further, the cover arrangement 400 comprises a further elongated member 454 attached to a long side edge of a second plate of the housing, wherein the cover 490 is arranged between the members 452,454.

Further, the support member 452 comprises a plate shaped fastening part 456 extending perpendicularly outwards in relation to a plate shaped element of the support member 452. The plate shaped fastening part 456 is formed in a one-piece unit with a plate shaped element of the support member 452. The plate shaped fastening part 456 is adapted for fastening in a wall, for example via a skim plaster layer 460, see FIG. 27. The plate shaped fastening part 456 therefore comprises a plurality of parallel and spaced ribs. The support member 454 comprises a similar plate shaped fastening base member 458.

Figure 27:
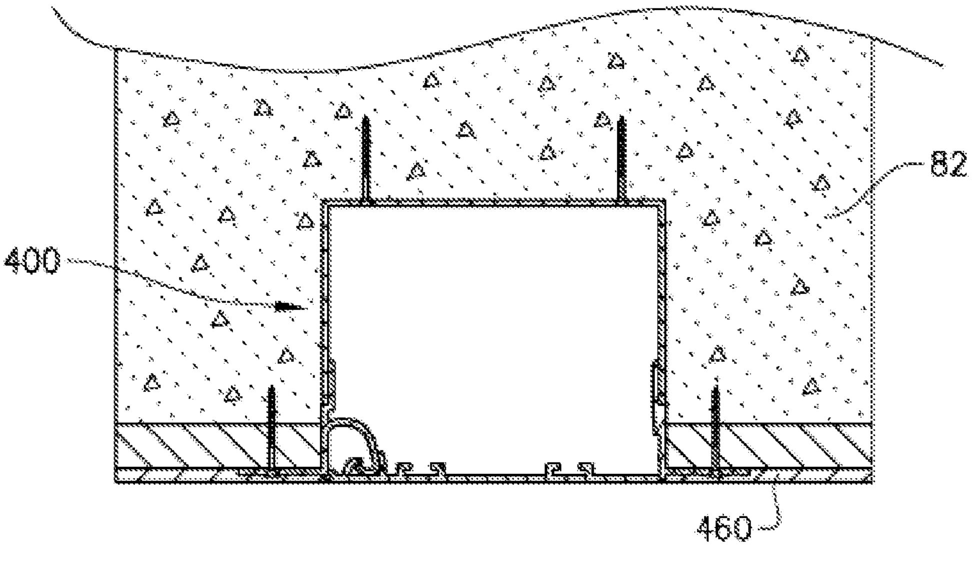
FIG. 27 shows the cover arrangement according to FIG. 26 applied in a wall.

FIG. 27 shows the cover arrangement 400 arranged in a groove in a wall portion 82 in a similar way as has been described above with regard to FIG. 9*a*.

Figure 28:
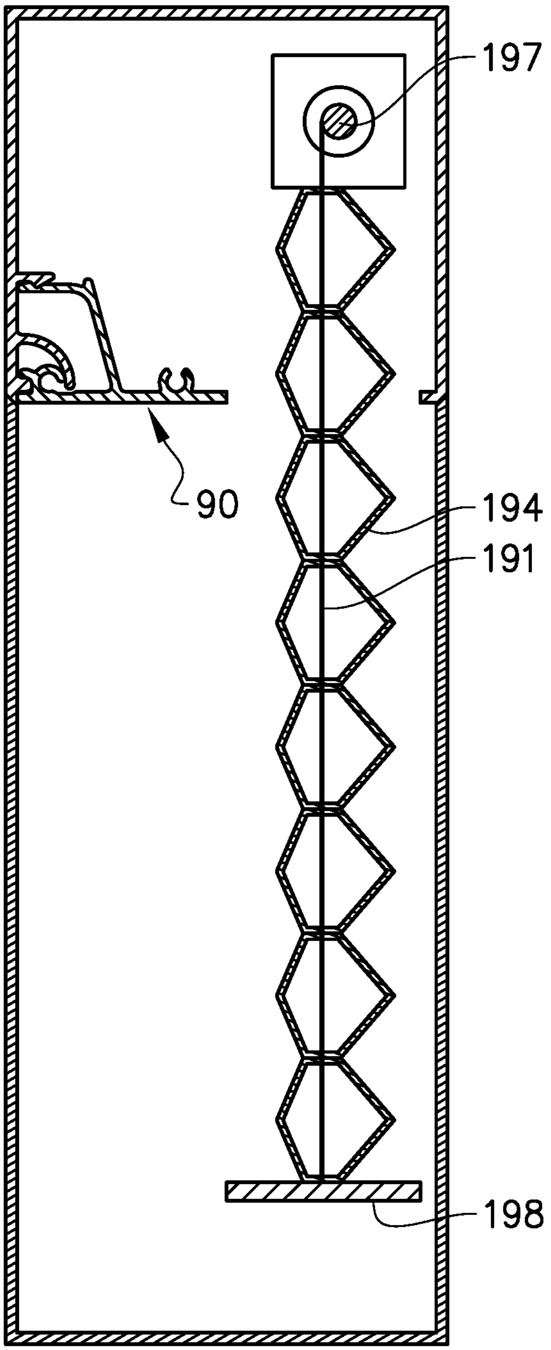
FIGS. 28 and 29 show an alternative design of a covering for the support arrangement in two different states.
Figure 29:
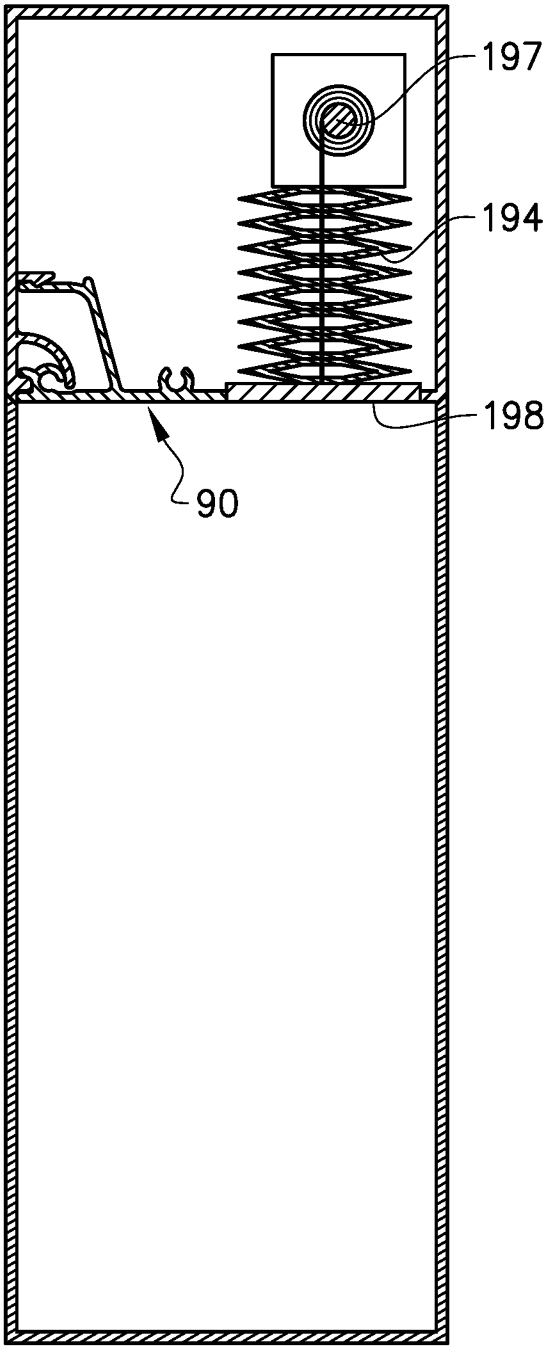

FIG. 28-29 show an alternative type of covering 194 for being used in association with the support arrangement. More specifically, the covering 194 is adapted to be arranged in a compressed state in the retracted state, see FIG. 29, and in an extended state, see FIG. 28. More specifically, the covering 194 is foldable and folded in the compressed state. The covering 194 may be formed by a fabric and may define a hollow structure. More specifically, covering 194 may be formed by a single wall structure or a double wall structure as seen in the figure. The fabric is held together by cords 191 that run through the material. Further, a roll 197 is arranged inside the elongated support member, wherein the cords 191 are attached at one end to the roll and to a cross bar 198 at the other end, wherein the cross bar compresses the fabric when the roll is turned in a first direction and extends the fabric when the roll is turned in the other direction.

It is to be understood that the present invention is not limited to the embodiments described above and illustrated in the drawings; rather, the skilled person will recognize that many changes and modifications may be made within the scope of the appended claims.

Even though the cover arrangements according to the first and second embodiments in FIGS. 1-2 and 3-4 have been described for a joint application in FIG. 5, it should not be regarded as limiting example. Instead, each one of the cover arrangements according to the first and second embodiments may be used separately or in other combinations with each other. Further, the cover arrangement may be arranged in a sloping way, for example along an upper limitation of a window having a sloping design.

Further, the cover arrangement shown in FIGS. 25*a*-*d* may of course be applicable for connecting a cover to a support member of any other design, such as a box formed by plates as shown in FIG. 1.

Although the invention has been described above for a covering in the form of a sheet of fabric rolled on a roll, other types include a covering made up of several long horizontal or vertical slats of various types of hard material, including wood, plastic or metal which are held together by cords that run through the blind slats are conceivable.

Further, although the invention has been shown and described in association with a small, normal window, it may of course be used in larger applications, such as windows extending all the way between the floor and the ceiling, for bi-folding doors with multiple blinds, sliding doors with very wide blinds, gable windows etc.

The invention claimed is:

1. A cover arrangement for housing at least part of an extendable or movable covering, the cover arrangement comprising:

- a housing defining a space for enclosing at least part of the covering, the housing having a first leg, a second leg, and a web connecting a first end of the first leg and a first end of the second leg, the housing having an open end between a second end of the first leg and a second end of the second leg;
- a support member attachable to the second end of the first leg of the housing; and
- a cover pivotably attachable along a first edge to the support member by a pivot arrangement so that the cover is pivotable between a closed position in which the cover closes at least part of the open end of the housing and an open position;
- the pivot arrangement comprising
  - on the support member, when viewed in cross-section,
    - a base portion,
    - a support member projection attached at a first end of the support member projection to the base portion, the support member projection being arranged inside of the housing,
    - and
    - a tip portion having a first end attached at a second end of the support member projection,
    - the support member projection defining, with the base portion, a receptacle, the tip portion extending toward the first end of the support member projection so that the tip portion and the support member projection form a channel having an open end facing an interior of the receptacle and a bottom at an intersection of the tip portion and the support member projection, and on the cover, when viewed in cross-section,
    - a web portion, and
    - a cover projection, the cover projection being curved and having a cover projection free end, the cover projection free end being retained in the channel at least when the cover is in the open position and extending further into the channel toward the bottom of the channel as the cover is pivoted from the closed position to the open position.

2. A cover arrangement according to claim 1, wherein the base portion has an interior side for facing the space for the covering, an exterior side opposite the interior side adapted for facing a surface of a wall portion or roof portion, and an edge between the exterior side and the interior side, and wherein the channel is arranged proximate the edge of the base portion.

3. A cover arrangement according to claim 2, wherein the channel is arranged on the interior side of the base portion.

4. A cover arrangement according to claim 2, the channel is positioned at a distance from the edge of the base portion so that an edge of the cover fits outside the channel and surfaces of the edge of the base portion and an outward facing surface of the cover are substantially flush.

5. A cover arrangement according to claim 1, wherein the support member comprises engagement means for engagement with the cover in a connected state.

6. A cover arrangement according to claim 5, wherein the engagement means is adapted for a snap connection.

7. A cover arrangement according to claim 5, wherein the engagement means is arranged on the interior side of the base portion.

8. A cover arrangement according to claim 5, wherein the engagement means comprises a first engagement portion including a groove arranged at an edge of the support member and extending in a longitudinal direction of the support member for forming a locking engagement between the cover and the support member in the connected state.

9. A cover arrangement according to claim 8, wherein the first engagement portion comprises an engagement surface and wherein the first engagement portion is adapted for, during connection, allowing movement of one part of the support member and the cover past a widened section of the other part and thereafter urging back to an engagement state in a narrow section on another side of the widened section.

10. A cover arrangement according to claim 1, wherein the cover comprises engagement means adapted for engagement with the support member in a connected state.

11. A cover arrangement according to claim 10, wherein the engagement means is adapted for a snap connection.

12. A cover arrangement according to claim 10, wherein the engagement means is arranged on an interior side of the cover.

13. A cover arrangement according to claim 10, wherein the engagement means comprises an elongated projection at a free longitudinal end of the cover for being received in a correspondingly shaped groove in the support member.

14. A wall or roof defining an opening, wherein the wall or roof is provided with the cover arrangement according to claim 1 in a space for the cover arrangement, wherein the support member is attached to the wall portion or roof portion and wherein the cover is connected to the support member.

15. A wall or roof according to claim 14, wherein the space forms a groove, which groove is adapted for receipt of the support member and wherein the support member is arranged in the groove.

16. A wall or roof according to claim 14, wherein the support member is arranged along a first side of an opening in the wall or roof so that the cover is movable relative to the support member for covering the opening to different extents.

17. The cover arrangement as set forth in claim 1, wherein, in the open position, the cover is perpendicular to the closed position.

18. A cover arrangement for housing at least part of an extendable or movable covering, the cover arrangement comprising:

a housing defining a space for enclosing at least part of the covering, the housing having a first leg, a second leg, and a web connecting a first end of the first leg and a first end of the second leg, the housing having an open end between a second end of the first leg and a second end of the second leg;

a support member attachable to the second end of the first leg of the housing; and a cover pivotably attachable along a first edge to the support member by a pivot arrangement so that the cover is pivotable between a closed position in which the cover closes at least part of the open end of the housing and an open position;

the pivot arrangement comprising on the support member, when viewed in cross-section, a base portion, a support member projection attached at a first end of the support member projection to the base portion, and a tip portion having a first end attached at a second end of the support member projection, the support member projection defining, with the base portion, a receptacle, the tip portion extending toward the first end of the support member projection so that the tip portion and the support member projection form a channel having an open end facing an interior of the receptacle and a bottom at an intersection of the tip portion and the support member projection, and on the cover, when viewed in cross-section, a web portion, and a cover projection, the cover projection being curved and having a cover projection free end, the cover projection free end being retained in the channel at least when the cover is in the open position and extending further into the channel toward the bottom of the channel as the cover is pivoted from the closed position to the open position, wherein a distance between a free end of the tip portion and an interior surface of the base portion perpendicular to a plane parallel with the base portion is at least as large as a height of the cover projection in a direction perpendicular to a plane in parallel with the web portion of the cover.

19. The cover arrangement as set forth in claim 18, wherein, in the open position, the cover is perpendicular to the closed position.

* * * * *